(12) United States Patent
Katou et al.

(10) Patent No.: US 8,953,093 B2
(45) Date of Patent: Feb. 10, 2015

(54) IMAGING LENS AND IMAGING APPARATUS

(71) Applicant: Sony Corporation, Tokyo (JP)

(72) Inventors: Kouji Katou, Saitama (JP); Yumiko Uehara, Tokyo (JP); Motoyuki Otake, Saitama (JP)

(73) Assignee: Sony Corporation, Tokyo (JP)

( * ) Notice: Subject to any disclaimer, the term of this patent is extended or adjusted under 35 U.S.C. 154(b) by 5 days.

(21) Appl. No.: 13/958,942

(22) Filed: Aug. 5, 2013

(65) Prior Publication Data

US 2014/0071331 A1 Mar. 13, 2014

(30) Foreign Application Priority Data

Sep. 7, 2012 (JP) ................................. 2012-196889

(51) Int. Cl.
*H04N 5/225* (2006.01)
*G02B 9/08* (2006.01)
*G02B 9/58* (2006.01)
*G02B 13/18* (2006.01)

(52) U.S. Cl.
CPC .. *G02B 9/08* (2013.01); *G02B 9/58* (2013.01); *G02B 13/18* (2013.01)
USPC ............ 348/360; 348/345; 348/361; 359/794

(58) Field of Classification Search
CPC .......... H04N 5/23212; H04N 5/23293; H04N 5/23219; G03B 13/36; G02B 7/102
USPC ............................ 348/345, 360, 361; 359/794
See application file for complete search history.

(56) References Cited

U.S. PATENT DOCUMENTS

| 8,605,363 | B2* | 12/2013 | Sakai et al. ................... 359/684 |
| 2009/0323205 | A1* | 12/2009 | Park ............................... 359/753 |
| 2012/0194924 | A1* | 8/2012 | Sakai et al. ................... 359/738 |

FOREIGN PATENT DOCUMENTS

| JP | 2007-333790 | 12/2007 |
| JP | 2009-237542 | 10/2009 |

* cited by examiner

*Primary Examiner* — Twyler Haskins
*Assistant Examiner* — Fayez Bhuiyan
(74) *Attorney, Agent, or Firm* — Rader, Fishman & Grauer PLLC

(57) ABSTRACT

There is provided An imaging lens including a first lens group having a positive refractive power, an aperture stop, and a second lens group having a positive refractive power that are configured to be arranged sequentially from an object side to an image side. Focus is achieved by fixing the first lens group in an optical axis direction and moving the second lens group from the image side to the object side when a subject distance is changed from infinity to proximity. The first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be maximum.

7 Claims, 15 Drawing Sheets

100: IMAGING APPARATUS
11(1 TO 7): ZOOM LENS
12: IMAGE SENSOR

IMAGING LENS AND IMAGING APPARATUS

BACKGROUND

The present technology relates to a technical field of an imaging lens and an imaging apparatus, and more particularly, to a technical field of an imaging lens which is suitable for, particularly, a single-lens reflex camera or a video camera and in which a rear focus type is used and an imaging apparatus using the imaging lens.

In the past, so-called double Gauss imaging lenses have been suggested considerably as standard lenses (imaging lenses) with large apertures used in imaging apparatuses such as still cameras or video cameras.

In such double Gauss imaging lenses according to the related art, a whole extension type in which the whole lens is extended when a subject distance is changed from infinity to proximity is generally used (for example, see Japanese Unexamined Patent Application Publication No. 2007-333790).

On the other hand, in imaging apparatuses such as single-lens reflex cameras or video cameras, there is a high demand for fast autofocus, and a rear focus type is considerably used to realize fast autofocus (for example, see Japanese Unexamined Patent Application Publication No. 2009-237542).

SUMMARY

In the double Gauss imaging lens disclosed in Japanese Unexamined Patent Application Publication No. 2007-333790, however, correction of aberration at infinity, particularly comatic aberration (comatic flare), is not sufficiently performed and sufficiently high optical performance is not ensured. Further, the whole extension type is used. However, in the whole extension type, a change in performance is considerable when a subject distance is changed to proximity. In particular, a spherical aberration is considerably changed, and thus it may be difficult to realize fast autofocus.

In the imaging apparatus disclosed in Japanese Unexamined Patent Application Publication No. 2009-237542, an amount of movement of a focus lens group is set to be small by strengthening a refractive power of a focus group. However, since the refractive power of the focus group is strengthened, various aberrations at the time of the movement to proximity, particularly, a spherical aberration or field curvature, may be considerably changed, unfortunately.

It is desirable to provide an imaging lens and an imaging apparatus capable of ensuring excellent imaging performance from infinity to proximity while an amount of movement of a focus lens group is set to be small, and thus improving optical performance.

According to an embodiment of the present technology, there is provided an imaging lens including a first lens group having a positive refractive power, an aperture stop, and a second lens group having a positive refractive power that are configured to be arranged sequentially from an object side to an image side. Focus is achieved by fixing the first lens group in an optical axis direction and moving the second lens group from the image side to the object side when a subject distance is changed from infinity to proximity. The first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be maximum. A following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

Accordingly, in the imaging lens, the refractive powers of the object-side lens group of the first lens group and the second lens group become suitable.

According to another embodiment of the present technology, it is preferable that a following Condition Expression (2) is satisfied.

As the imaging lens satisfies the foregoing Condition Expression (2), the refractive power of the first lens group becomes suitable. Thus, back focus of the lens system can sufficiently be ensured and the entire length can be shortened.

According to another embodiment of the present technology, it is preferable that the object-side lens group includes a first lens having a positive refractive power and a second lens having a negative refractive power that are configured to be arranged sequentially from the object side to the image side.

The object-side lens group includes the first lens having the positive refractive power and the second lens having the negative refractive power that are configured to be arranged sequentially from the object side to the image side. Thus, an air space between the first and second lens decreases and the degree of curve of a light beam oriented from the first lens to the second lens is suppressed.

According to another embodiment of the present technology, it is preferable that the second lens group includes two pairs of cemented lenses.

The second lens group includes two pairs of cemented lenses. Thus, a high-order spherical aberration is satisfactorily corrected.

According to another embodiment of the present technology, it is preferable that each of the first lens group and the second lens group includes at least one aspheric lens.

Each of the first and second lens groups includes at least one aspheric lens. Thus, correction of a spherical aberration, field curvature, and an off-axis comatic aberration is performed by the aspheric lens.

According to another embodiment of the present technology, it is preferable that when the subject distance is changed from infinity to proximity, the aperture stop and the second lens group are integrally configured and moved from the image side to the object side.

When the subject distance is changed from infinity to proximity, the aperture stop and the second lens group are integrally configured and moved from the image side to the object side. Thus, an amount of peripheral light increases from infinity to proximity, compared to a rear focus type in which an aperture stop is fixed and only the second lens group is moved in the optical axis direction.

According to another embodiment of the present technology, there is provided an imaging apparatus including an imaging lens, and an image sensor that converts an optical image formed by the imaging lens into an electric signal. The imaging lens includes a first lens group having a positive refractive power, an aperture stop, and a second lens group having a positive refractive power that are configured to be arranged sequentially from an object side to an image side. Focus is achieved by fixing the first lens group in an optical axis direction and moving the second lens group from the image side to the object side when a subject distance is changed from infinity to proximity. The first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be maximum. A following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

Accordingly, in the imaging lens of the imaging apparatus, the refractive powers of the object-side lens group of the first lens group and the second lens group become suitable.

The imaging lens according to an embodiment of the present technology includes an imaging lens including a first lens group having a positive refractive power, an aperture stop, and a second lens group having a positive refractive power that are configured to be arranged sequentially from an object side to an image side. Focus is achieved by fixing the first lens group in an optical axis direction and moving the second lens group from the image side to the object side when a subject distance is changed from infinity to proximity. The first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be maximum. A following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

Accordingly, excellent image-forming performance from infinity to proximity is ensured while an amount of movement of a focus lens group is set to be small when the subject distance is changed from infinity to proximity, and thus optical performance can be achieved.

According to a second embodiment of the present technology, a following Condition Expression (2) is satisfied, $$1.8 < f1/f < 4.5, \quad (2)$$

where f1 is a focal distance of the first lens group at the infinity focus time and f is a focal distance of an entire lens system at the infinity focus time.

Accordingly, it is possible to satisfactorily correct a distortion aberration or a spherical aberration, while sufficient back focus is ensured, and reduction in manufacturing sensitivity is achieved.

According to a third embodiment of the present technology, the object-side lens group includes a first lens having a positive refractive power and a second lens having a negative refractive power that are configured to be arranged sequentially from the object side to the image side.

Accordingly, since the air space between the first and second lenses can decrease and the degree of the curve of a light beam oriented from the first lens to the second lens can be suppressed, the sensitivity of the air space between the first and second lenses can be suppressed.

According to a fourth embodiment of the present technology, the second lens group includes two pairs of cemented lenses.

Accordingly, it is possible to satisfactorily correct a high-order spherical aberration and achieve simplicity of the configuration of a lens tube or ease of manufacturing.

According to a fifth embodiment of the present technology, each of the first lens group and the second lens group includes at least one aspheric lens.

Accordingly, it is possible to satisfactorily correct a spherical aberration or field curvature and satisfactorily correct an off-axis comatic aberration.

According to a sixth embodiment of the present technology, when the subject distance is changed from infinity to proximity, the aperture stop and the second lens group are integrally configured and moved from the image side to the object side.

Accordingly, it is possible to ensure a sufficient amount of peripheral light from infinity to proximity, compared to the rear focus type in which an aperture stop is fixed and only the second lens group is moved in the optical axis direction.

According to a seventh embodiment of the present technology, there is provided an imaging apparatus including an imaging lens, and an image sensor that converts an optical image formed by the imaging lens into an electric signal. The imaging lens includes a first lens group having a positive refractive power, an aperture stop, and a second lens group having a positive refractive power that are configured to be arranged sequentially from an object side to an image side. Focus is achieved by fixing the first lens group in an optical axis direction and moving the second lens group from the image side to the object side when a subject distance is changed from infinity to proximity. The first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be maximum. A following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

Accordingly, excellent imaging performance from infinity to proximity is ensured while an amount of movement of a focus lens group is set to be small at the time of change in the subject distance from infinity to proximity, and thus optical performance can be achieved.

DETAILED DESCRIPTION OF THE EMBODIMENTS

Figure 1:
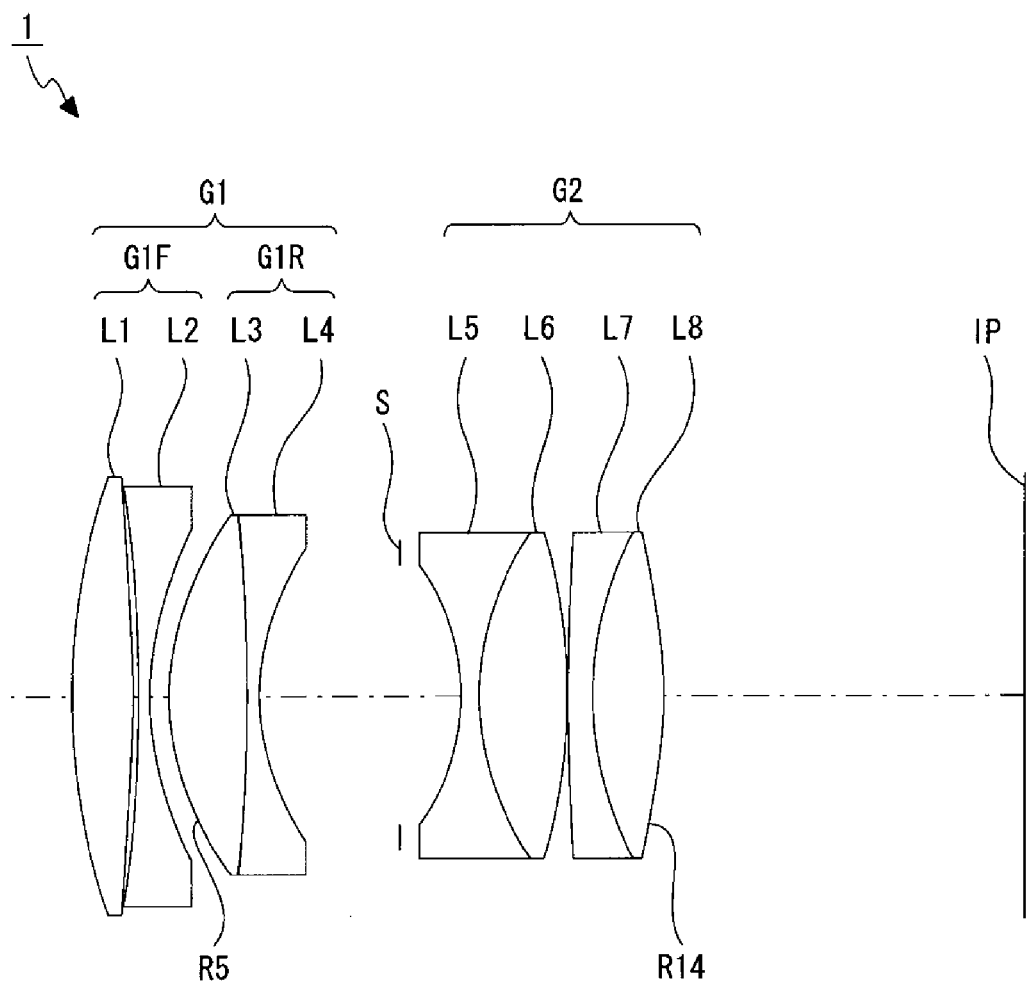
FIG. 1 is a diagram illustrating an imaging lens and an imaging apparatus together with FIGS. 2 to 15 according to a preferred embodiment of the present technology and is a diagram illustrating the configuration of an imaging lens according to a first embodiment.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, an imaging lens and an imaging apparatus according to preferred embodiments of the present technology will be described.

Configuration of Imaging Lens

An imaging lens according to an embodiment of the present technology includes a first lens group having a positive refractive power, an aperture stop, and a second lens group having a positive refractive power that are configured to be arranged sequentially from an object side to an image side. Focus is achieved by fixing the first lens group in an optical axis direction and moving the second lens group from the image side to the object side when a subject distance is changed from infinity to proximity.

In the imaging lens according to the embodiment of the present technology, the first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be the maximum.

In the imaging lens according to the embodiment of the present technology, a rear focus type in which the first lens group is fixed in the optical axis direction and the second lens group is moved from the image side to the object side when the subject distance is changed from infinity to proximity is used. Accordingly, the focus lens group (second lens group) can be reduced in weight, and thus fast autofocus can be realized.

Further, in the imaging lens according to the embodiment of the present technology, the following Condition Expression (1) is satisfied:

$$-13.0 < f1F/f2 < -4.0, \tag{1}$$

where f1F is a focal distance of the object-side lens group at an infinity focus time and f2 is a focal distance of the second lens group at the infinity focus time.

The foregoing Condition Expression (1) defines a ratio of the focal distance of the object-side lens group to the focal distance of the second lens group at the infinity focus time.

When the ratio is less than the lower limit of the foregoing Condition Expression (1), the refractive power of the object-side lens group is too weak, and thus it may be difficult to ensure sufficient back focus of the lens system. At this time, to ensure the sufficient back focus, it is necessary to strengthen the refractive power of a negative lens disposed to be closer to the image side than the object-side lens group. However, when the refractive power of the negative lens disposed to be closer to the image side than the object-side lens group is strengthened, it may be difficult to correct a spherical aberration or a comatic aberration.

Conversely, when the ratio is greater than the upper limit of the foregoing Condition Expression (1), the refractive power of the second lens group is too weak, an amount of movement of the focus lens group (second lens group) may increase when the subject distance is changed from infinity to proximity, and thus the lens system may increase in size. Further, a change in the spherical aberration may increase at the time of proximity, and thus deterioration in the optical performance may be caused.

Accordingly, when the imaging lens satisfies the foregoing Condition Expression (1), excellent imaging performance from infinity to proximity is ensured while an amount of movement of a focus lens group is set to be small at the time of change in the subject distance from infinity to proximity, and thus optical performance can be achieved.

Further, the imaging lens more preferably satisfies the following Condition Expression (1)':

$$-12.0 < f1F/f2 < -5.0. \tag{1)'}$$

Accordingly, when the imaging lens satisfies the foregoing Condition Expression (1)', the excellent imaging performance from infinity to proximity is ensured while an amount of movement of a focus lens group is set to be smaller at the time of change in the subject distance from infinity to proximity, and thus optical performance can be further achieved.

In the imaging lens according to the embodiment of the present technology, the following Condition Expression (2) is preferably satisfied:

$$1.8 < f1/f < 4.5, \tag{2}$$

where f1 is a focal distance of the first lens group at the infinity focus time and f is a focal distance of an entire lens system at the infinity focus time.

The foregoing Condition Expression (2) defines a ratio of the focal distance of the first lens group to the focal distance of the entire lens system at the infinity focus time.

When the ratio is less than the lower limit of the foregoing Condition Expression (2), the refractive power of the first lens group is too strong, and thus it may be difficult to ensure the sufficient back focus of the lens system. Further, the correction of the distortion aberration or the spherical aberration may not be sufficiently performed.

Conversely, when the ratio is greater than the upper limit of the foregoing Condition Expression (2), the refractive power of the first lens group is too weak, and the entire length may be lengthened. At this time, to shorten the entire length, it is necessary to strengthen the refractive power of the second lens group. However, when the refractive power of the second lens group is strengthened, it may be difficult to correct the spherical aberration and the manufacturing sensitivity may increase.

Accordingly, when the imaging lens satisfies the foregoing Condition Expression (2), it is possible to satisfactorily correct the distortion aberration or the spherical aberration, while sufficient back focus is ensured, and reduction in manufacturing sensitivity can be achieved.

In the imaging lens, the following Condition Expression (2)' is more preferably satisfied:

$$2.0 < f1/f < 4.0. \quad (2)'$$

When the imaging lens satisfies the foregoing Condition Expression (2)', it is possible to more satisfactorily correct the distortion aberration or the spherical aberration, while sufficient back focus is ensured, and more reduction in the manufacturing sensitivity can be achieved.

In the imaging lens, the following Condition Expression (2)" is more preferably satisfied:

$$2.4 < f1/f < 3.6. \quad (2)''$$

When the imaging lens satisfies the foregoing Condition Expression (2)", it is possible to still more satisfactorily correct the distortion aberration or the spherical aberration, while sufficient back focus is ensured, and still more reduction in the manufacturing sensitivity can be achieved.

In the imaging lens according to the embodiment of the present technology, the object-side lens group includes a first lens having a positive refractive power and a second lens having a negative refractive power that are configured to be arranged sequentially from the object side to the image side.

When the object-side lens group includes the first lens having the positive refractive power and the second lens having the negative refractive power that are configured to be arranged sequentially from the object side to the image side, it is possible to reduce the air space between the first and second lenses, and thus to suppress the degree of curve of a light beam oriented from the first lens to the second lens. Accordingly, the sensitivity of the air space between the first and second lenses can be suppressed.

In the imaging lens according to the embodiment of the present technology, the second lens group preferably includes two pairs of cemented lenses.

When the second lens group includes the two pairs of cemented lenses, it is possible to satisfactorily correct a high-order spherical aberration and achieve simplicity of the configuration of a lens tube or ease of manufacturing.

In the imaging lens according to the embodiment of the present technology, each of the first lens group and the second lens group preferably includes at least one aspheric lens.

When the first lens group includes at least one aspheric lens, it is possible to satisfactorily correct the spherical aberration or field curvature. When the second lens group includes at least one aspheric lens, it is possible to satisfactorily correct off-axis comatic aberration.

In the imaging lens according to the embodiment of the present technology, when the subject distance is changed from infinity to proximity, the aperture stop and the second lens group are preferably integrally configured and moved from the image side to the object side.

When the subject distance is changed from infinity to proximity, it is possible to sufficiently ensure an amount of peripheral light from infinity to proximity by integrally configuring the aperture stop and the second lens group and moving the aperture stop and the second lens group from the image side to the object side, compared to the rear focus type in which an aperture stop is fixed and only the second lens group is moved in the optical axis direction.

Numerical Example of Imaging Lens

Hereinafter, an imaging lens according to a specific embodiment of the present technology and a numerical example in which specific numerical values are applied to the imaging lens according to the embodiment will be described with reference to the drawings and tables.

Further, the meanings of signs used in each table or description are as follows.

"Surface number" denotes a surface number of an $i^{th}$ surface numbered from the object side to the image side, "R" denotes a paraxial radius of curvature of an $i^{th}$ surface, "D" denotes an on-axis surface distance (thickness or air gap of the center of a lens) between an $i^{th}$ surface and an $i+1^{th}$ surface, "Nd" denotes a refractive index of a line d ($\lambda$=587.6 nm) of a lens or the like starting from an $i^{th}$ surface, and "vd" denotes an Abbe number of the line d of a lens or the like starting from an $i^{th}$ surface.

"ASP" denotes an aspheric surface of a corresponding surface in association with "surface number."

"k" is a cone constant (conic constant) and "A4," "A6," "A8," and "A10" denote fourth, sixth, eighth, and tenth order aspheric coefficients, respectively.

"f" denotes a focal distance, "Fno" denotes an F number, "BF" denotes a back focus, and "ω" denotes a half field angle.

In each table that shows the following aspheric coefficients, "E–n" indicates an exponential notation in which 10 is the base, that is, "10 to the negative $n^{th}$ power." For example, "0.12345E-0.5" indicates "0.12345×(10 to the negative $5^{th}$ power)."

In an imaging lens described in each embodiment, some of the lens surfaces are aspheric. On the assumption that "x" is a distance (sag amount) from the apex of a lens surface in an optical axis direction, "y" is a height (image height) in a direction perpendicular to the optical axis direction, "c" is a paraxial curvature (the reciprocal of a radius of curvature) in the apex of a lens, "k" is a cone constant (cone constant), and "Ai" is each degree of aspheric coefficients, the shape of an aspheric surface is defined as in Equation 1 below.

$$x = \frac{y^2 \cdot c^2}{1 + \{1 - (1+\kappa) \cdot y^2 \cdot c^2\}^{1/2}} + \Sigma Ai \cdot yi \quad \text{Equation 1}$$

An imaging lens 1 to an imaging lens 7 according to first to seventh embodiments to be described below each include a first lens group G1 having a positive refractive power, an aperture stop S, and a second lens group G2 having a positive refractive power that are configured to be arranged sequentially from an object side to an image side.

First Embodiment

FIG. 1 is a diagram illustrating the configuration of an imaging lens 1 according to a first embodiment of the present technology.

In the imaging lens 1, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G2 and is moved from the image side to the object side when the subject distance is changed from infinity to proximity.

Table 1 shows lens data of Numerical Example 1 in which specific numerical values are applied to the imaging lens 1 according to the first embodiment.

TABLE 1

| Surface Number | R | D | Nd | νd |
|---|---|---|---|---|
| 1 | 63.162 | 6.056 | 1.834805 | 42.7 |
| 2 | −235.242 | 0.598 | | |
| 3 | −151.479 | 1.300 | 1.592703 | 35.4 |
| 4 | 35.000 | 2.000 | | |
| 5 (ASP) | 28.841 | 7.657 | 1.851348 | 40.1 |
| 6 | −198.594 | 1.200 | 1.612930 | 37.0 |
| 7 | 25.666 | 14.067 | | |
| 8 | infinity | 6.004 | | |
| 9 | −22.734 | 1.582 | 1.647690 | 33.8 |
| 10 | 26.722 | 9.000 | 1.883000 | 40.8 |
| 11 | −56.939 | 0.200 | | |
| 12 | 222.462 | 2.466 | 1.717360 | 29.5 |
| 13 | 34.696 | 6.815 | 1.801387 | 45.4 |
| 14 (ASP) | −50.857 | — | | |

In the imaging lens 1, an object-side surface (fifth surface) of the third lens L3 of the first lens group G1 and an image-side surface (fourteenth surface) of the eighth lens L8 of the second lens group G2 are aspheric. The fourth-order aspheric coefficient A4, the sixth-order aspheric coefficient A6, the eighth order aspheric coefficient A8, and the tenth order aspheric coefficient A10 of the aspheric surfaces in Numerical Example 1 are shown together with the cone constants k in Table 2.

TABLE 2

| Surface Number | κ | A4 | A6 | A8 | A10 |
|---|---|---|---|---|---|
| 5 | 0.0000 | −1.02E−06 | −1.40E−09 | 1.13E−12 | −1.33E−15 |
| 14 | −1.0388 | 6.69E−06 | −1.24E−09 | 2.47E−11 | −3.41E−15 |

The focal distance f, the F number Fno, the back focus BF, and the half field angle ω of the entire lens system at the infinity focus time in Numerical Example 1 are shown in Table 3.

TABLE 3

| f | 51.5 |
|---|---|
| Fno | 1.45 |
| BF | 35.998 |
| ω | 23.41 |

Figure 2:
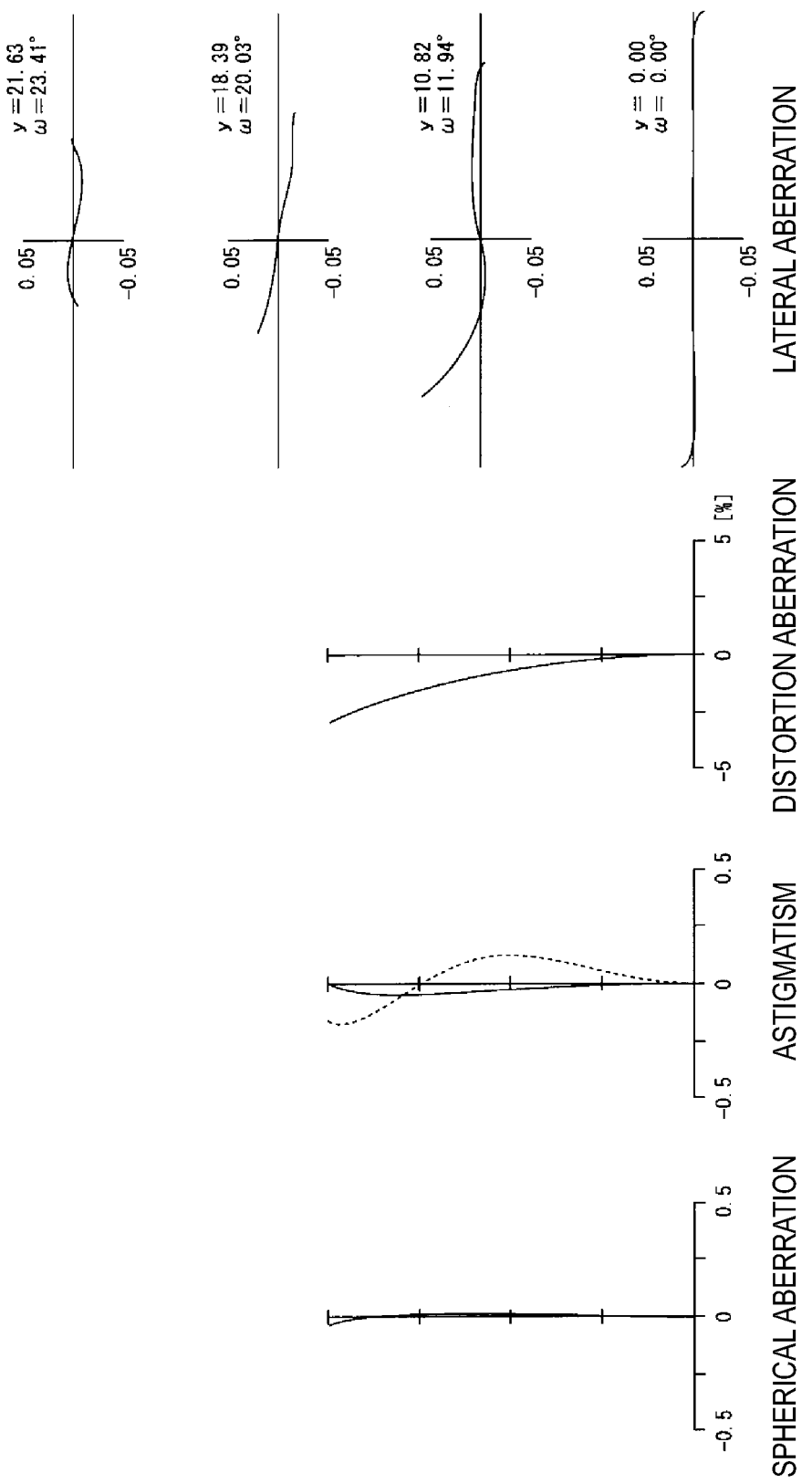
FIG. 2 is a diagram illustrating a spherical aberration, an astigmatism, a distortion aberration, and a lateral aberration in specific numerical values according to the first embodiment.

FIG. 2 illustrates a spherical aberration, an astigmatism, a distortion aberration, and a lateral aberration at an infinity focus state in Numerical Example 1.

In FIG. 2, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 1.

Second Embodiment

Figure 3:
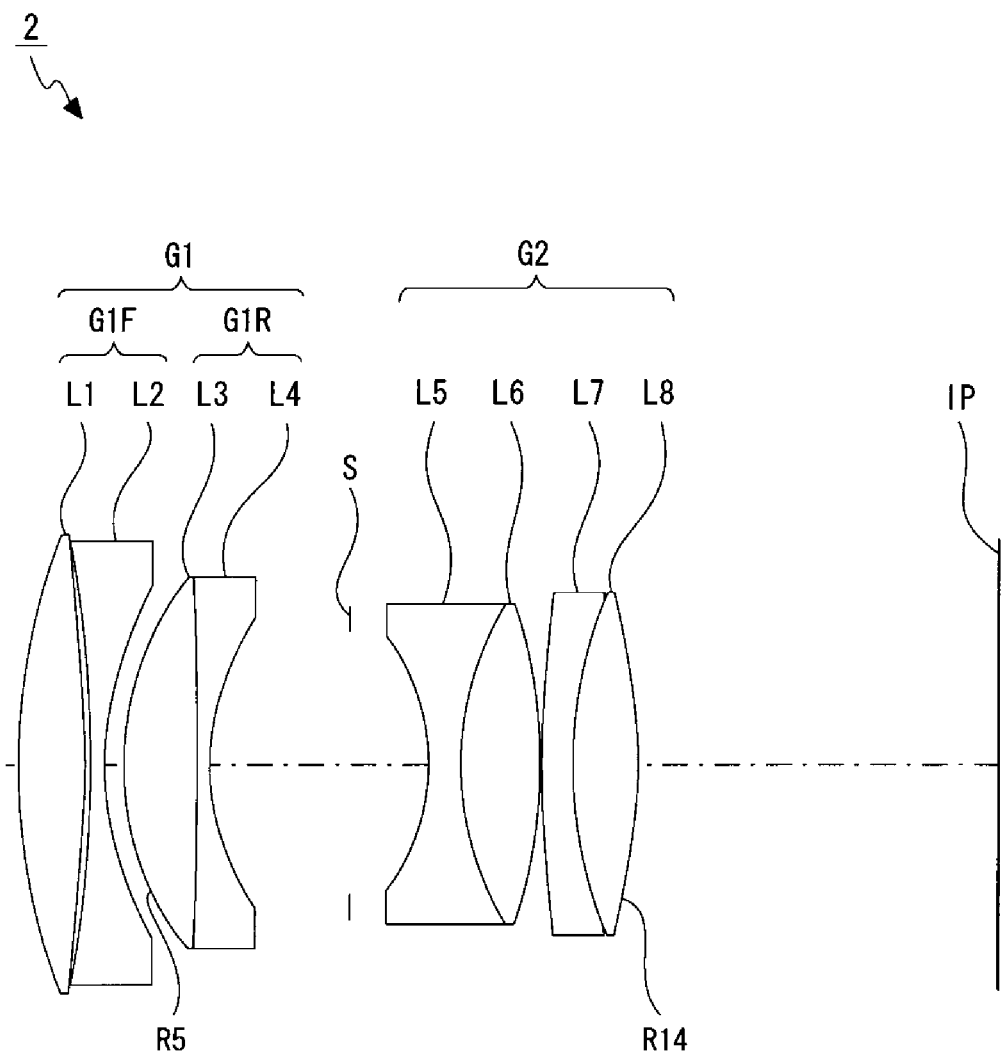
FIG. 3 is a diagram illustrating the configuration of an imaging lens according to a second embodiment.

FIG. 3 is a diagram illustrating the configuration of an imaging lens 2 according to a second embodiment of the present technology.

In the imaging lens 2, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G2 and is moved from the image side to the object side when the subject distance is changed from infinity to proximity.

Table 4 shows lens data of Numerical Example 2 in which specific numerical values are applied to the imaging lens 2 according to the second embodiment.

TABLE 4

| Surface Number | R | D | Nd | νd |
|---|---|---|---|---|
| 1 | 65.394 | 6.591 | 1.834805 | 42.7 |
| 2 | −174.403 | 0.741 | | |
| 3 | −127.563 | 1.300 | 1.592703 | 35.4 |
| 4 | 35.000 | 2.000 | | |
| 5 (ASP) | 29.459 | 7.554 | 1.882023 | 37.2 |
| 6 | −260.016 | 1.200 | 1.647690 | 33.8 |
| 7 | 26.509 | 14.026 | | |
| 8 | infinity | 8.130 | | |
| 9 | −21.790 | 3.082 | 1.654362 | 33.2 |
| 10 | 30.624 | 8.260 | 1.883000 | 40.8 |
| 11 | −49.935 | 0.200 | | |
| 12 | 146.407 | 2.950 | 1.724825 | 28.4 |
| 13 | 44.548 | 6.621 | 1.772501 | 49.5 |
| 14 (ASP) | −50.211 | — | | |

In the imaging lens 2, an object-side surface (fifth surface) of the third lens L3 of the first lens group G1 and an image-side surface (fourteenth surface) of the eighth lens L8 of the second lens group G2 are aspheric. The fourth-order aspheric coefficient A4, the sixth-order aspheric coefficient A6, the eighth order aspheric coefficient A8, and the tenth order aspheric coefficient A10 of the aspheric surfaces in Numerical Example 2 are shown together with the cone constants k in Table 5.

TABLE 5

| Surface Number | κ | A4 | A6 | A8 | A10 |
|---|---|---|---|---|---|
| 5 | 0.0000 | −9.84E−07 | −6.92E−10 | −1.13E−12 | 3.26E−15 |
| 14 | 0.6967 | 7.28E−06 | −8.16E−10 | 2.03E−11 | −1.10E−14 |

The focal distance f, the F number Fno, the back focus BF, and the half field angle ω of the entire lens system at the infinity focus time in Numerical Example 2 are shown in Table 6.

TABLE 6

| | |
|---|---|
| f | 51.5 |
| Fno | 1.44 |
| BF | 36.221 |
| ω | 23.40 |

Figure 4:
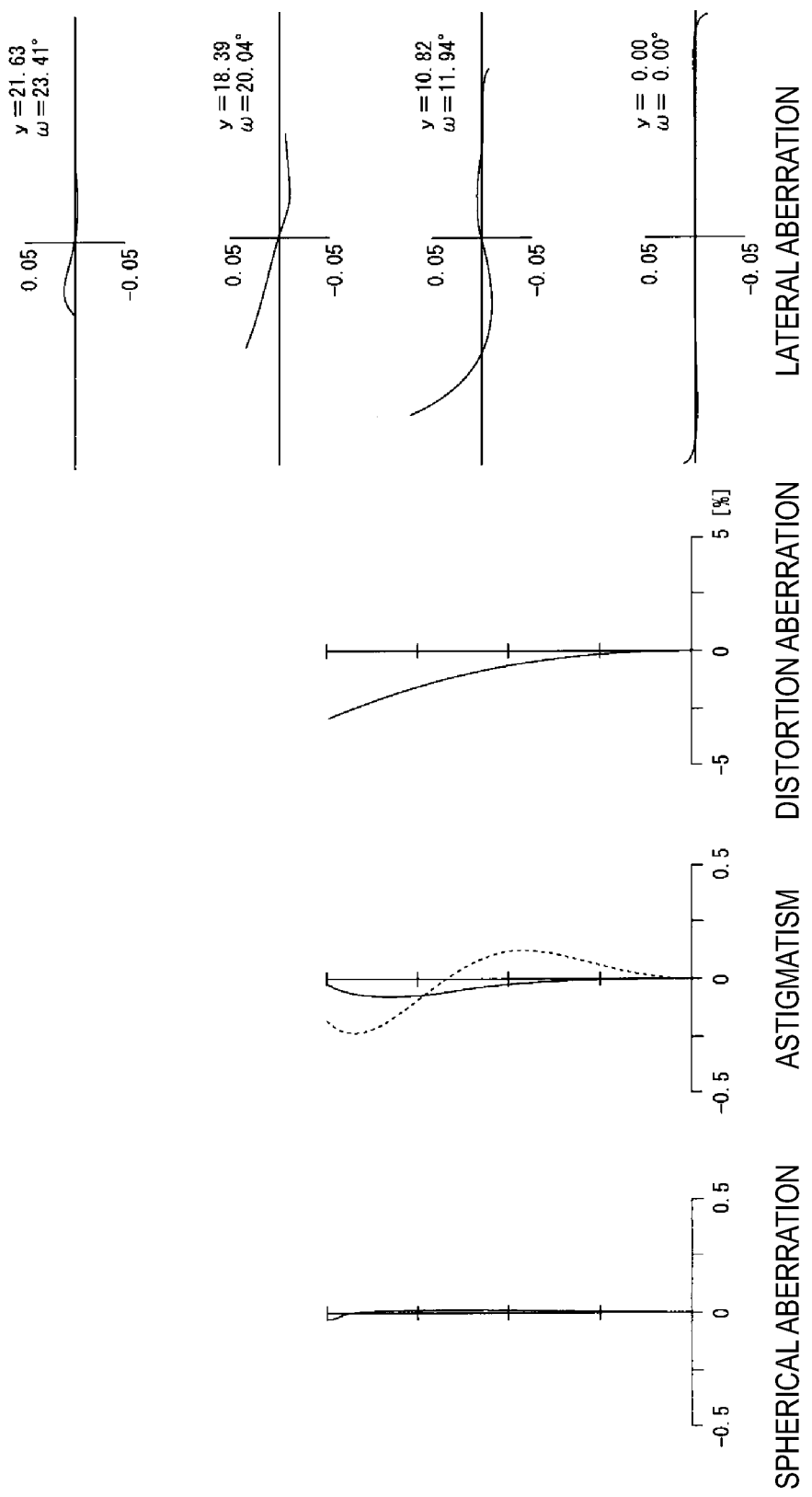
FIG. 4 is a diagram illustrating a spherical aberration, an astigmatism, a distortion aberration, and a lateral aberration in specific numerical values according to the second embodiment.

FIG. 4 illustrates a spherical aberration, an astigmatism, a distortion aberration, and a lateral aberration at an infinity focus state in Numerical Example 2.

In FIG. 4, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 2.

Third Embodiment

Figure 5:
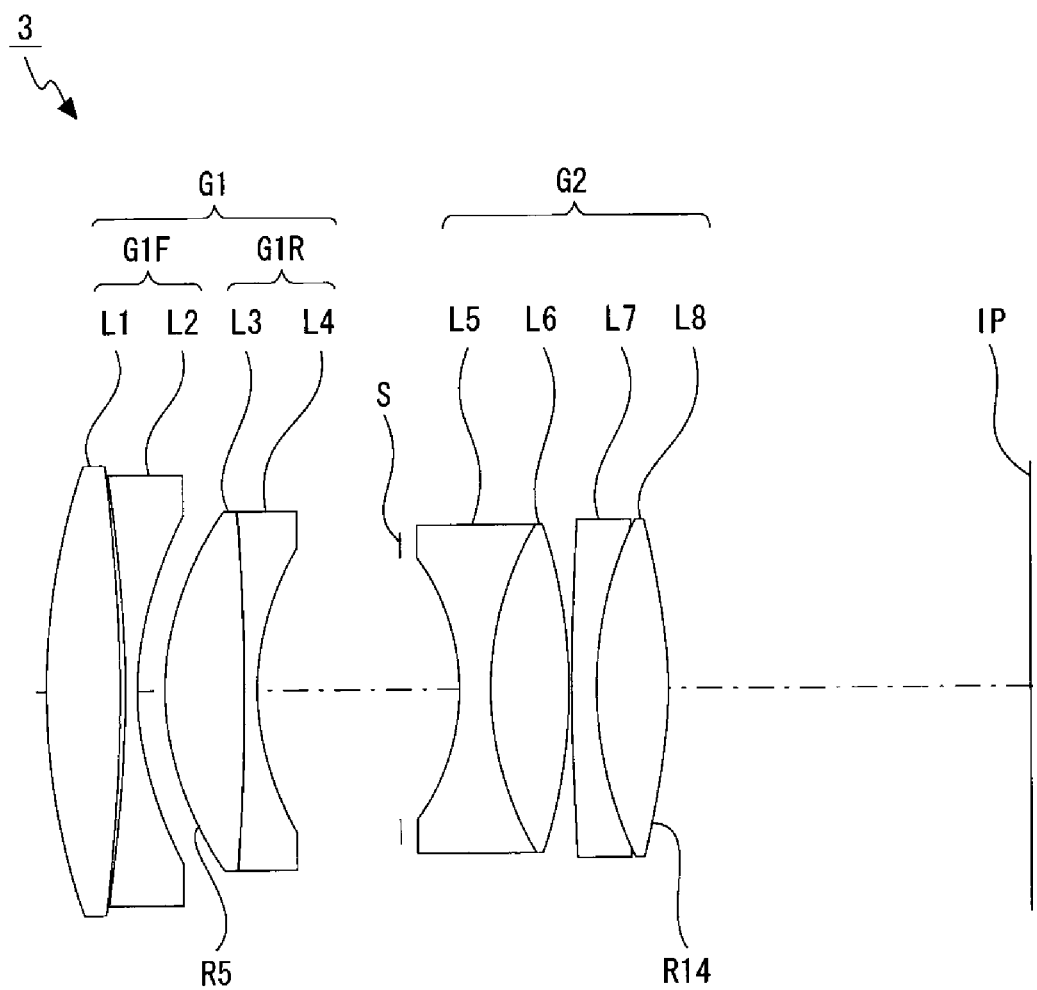
FIG. 5 is a diagram illustrating the configuration of an imaging lens according to a third embodiment.

FIG. 5 is a diagram illustrating the configuration of an imaging lens 3 according to a third embodiment of the present technology.

In the imaging lens 3, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G2 and is moved from the image side to the object side when the subject distance is changed from infinity to proximity.

Table 7 shows lens data of Numerical Example 3 in which specific numerical values are applied to the imaging lens 3 according to the third embodiment.

TABLE 7

| Surface Number | R | D | Nd | vd |
|---|---|---|---|---|
| 1 | 68.507 | 7.500 | 1.834805 | 42.7 |
| 2 | −151.036 | 0.350 | | |
| 3 | −121.340 | 1.300 | 1.592703 | 34.5 |
| 4 | 35.000 | 2.610 | | |
| 5 (ASP) | 29.374 | 7.970 | 1.882023 | 37.2 |
| 6 | −278.736 | 1.200 | 1.647690 | 33.8 |
| 7 | 26.881 | 14.214 | | |
| 8 | infinity | 5.980 | | |
| 9 | −22.069 | 2.960 | 1.647689 | 33.8 |
| 10 | 30.122 | 7.940 | 1.883000 | 40.8 |
| 11 | −50.458 | 0.200 | | |
| 12 | 189.508 | 2.630 | 1.717360 | 29.5 |
| 13 | 40.196 | 6.900 | 1.772501 | 49.5 |
| 14 (ASP) | −50.203 | — | | |

In the imaging lens 3, an object-side surface (fifth surface) of the third lens L3 of the first lens group G1 and an image-side surface (fourteenth surface) of the eighth lens L8 of the second lens group G2 are aspheric. The fourth-order aspheric coefficient A4, the sixth-order aspheric coefficient A6, the eighth order aspheric coefficient A8, and the tenth order aspheric coefficient A10 of the aspheric surfaces in Numerical Example 3 are shown together with the cone constants k in Table 8.

TABLE 8

| Surface Number | κ | A4 | A6 | A8 | A10 |
|---|---|---|---|---|---|
| 5 | 0.0000 | −1.13E−06 | 1.18E−10 | −4.31E−12 | 8.06E−15 |
| 14 | −1.9999 | 4.73E−06 | 6.73E−10 | 1.45E−11 | 5.36E−16 |

The focal distance f, the F number Fno, the back focus BF, and the half field angle ω of the entire lens system at the infinity focus time in Numerical Example 3 are shown in Table 9.

TABLE 9

| f | 51.5 |
|---|---|
| Fno | 1.45 |
| BF | 36.108 |
| ω | 23.33 |

Figure 6:
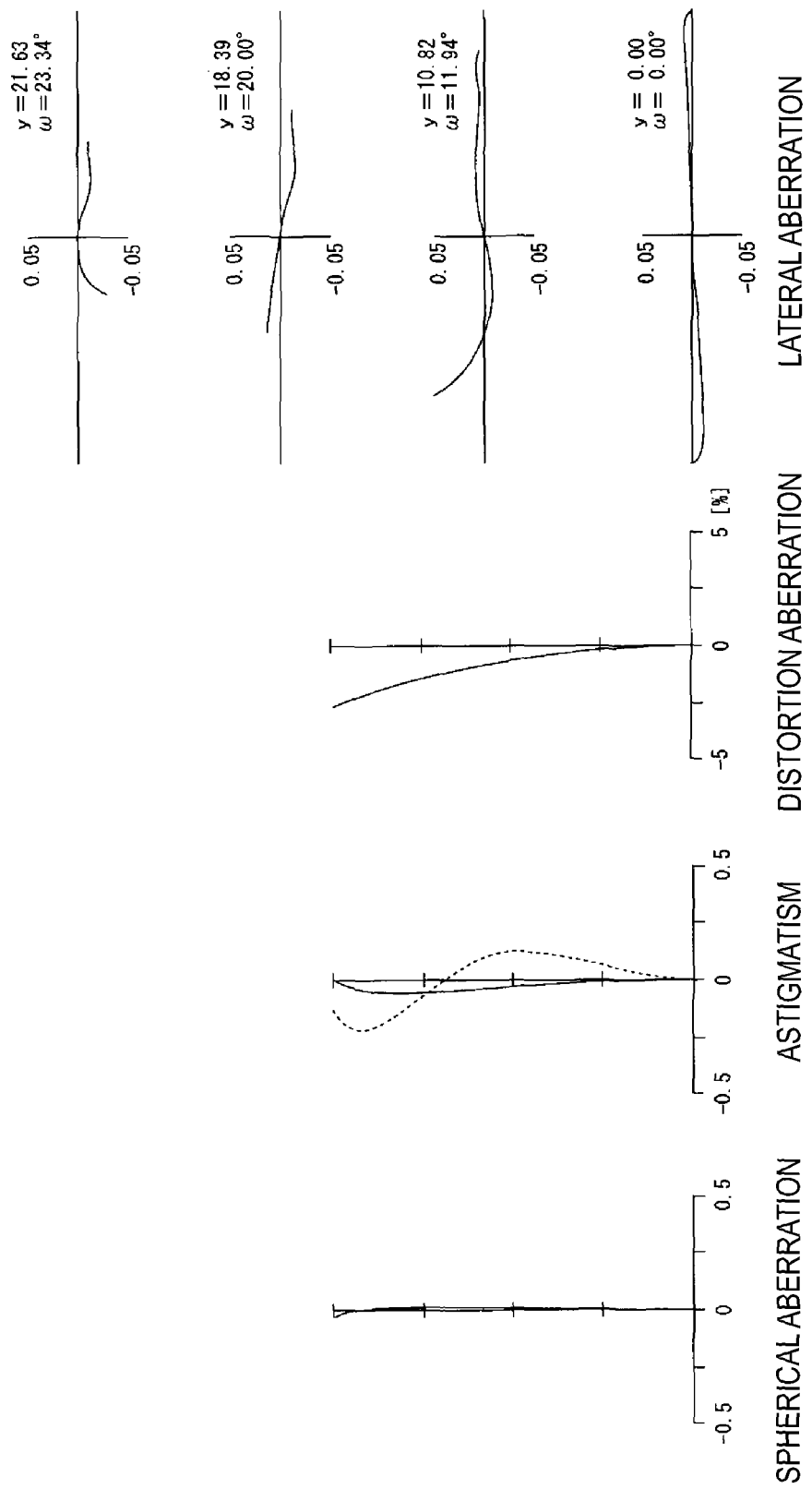
FIG. 6 is a diagram illustrating a spherical aberration, an astigmatism, a distortion aberration, and a lateral aberration in specific numerical values according to the third embodiment.

FIG. 6 illustrates a spherical aberration, an astigmatism, a distortion aberration, and a lateral aberration at an infinity focus state in Numerical Example 3.

In FIG. 6, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 3.

Fourth Embodiment

Figure 7:
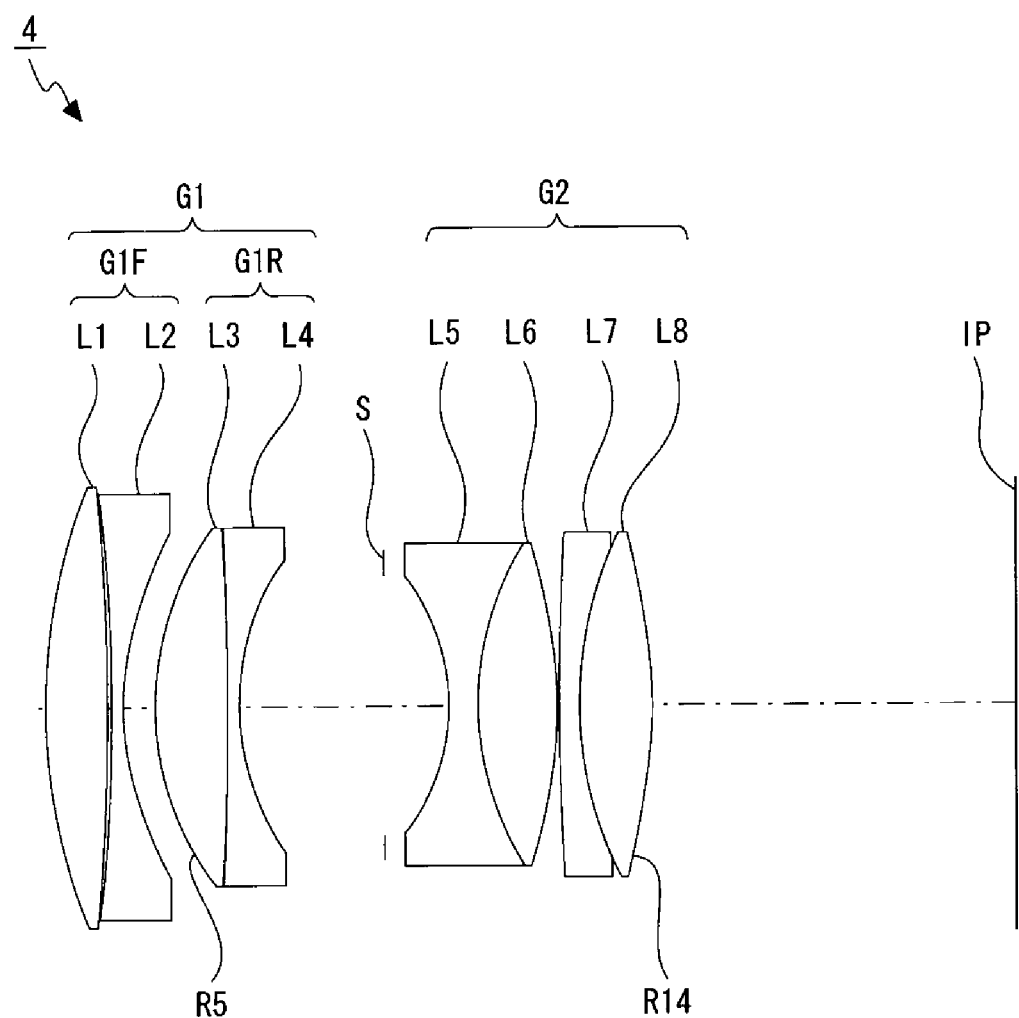
FIG. 7 is a diagram illustrating the configuration of an imaging lens according to a fourth embodiment.

FIG. 7 is a diagram illustrating the configuration of an imaging lens 4 according to a fourth embodiment of the present technology.

In the imaging lens 4, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G2 and is moved from the image side to the object side when the subject distance is changed from infinity to proximity.

Table 10 shows lens data of Numerical Example 4 in which specific numerical values are applied to the imaging lens 4 according to the fourth embodiment.

TABLE 10

| Surface Number | R | D | Nd | vd |
|---|---|---|---|---|
| 1 | 60.388 | 6.040 | 1.834805 | 42.7 |
| 2 | −214.645 | 0.370 | | |
| 3 | −156.603 | 1.300 | 1.592703 | 35.5 |
| 4 | 35.000 | 3.000 | | |
| 5 (ASP) | 28.547 | 7.170 | 1.851348 | 40.1 |
| 6 | −503.384 | 1.200 | 1.612930 | 37.0 |
| 7 | 25.007 | 14.509 | | |
| 8 | infinity | 6.333 | | |
| 9 | −21.841 | 2.800 | 1.647690 | 33.8 |
| 10 | 30.673 | 7.940 | 1.883000 | 40.8 |
| 11 | −47.908 | 0.200 | | |
| 12 | 247.339 | 2.130 | 1.698950 | 30.1 |
| 13 | 38.671 | 7.000 | 1.768015 | 49.2 |
| 14 (ASP) | −50.305 | — | | |

In the imaging lens 4, an object-side surface (fifth surface) of the third lens L3 of the first lens group G1 and an image-side surface (fourteenth surface) of the eighth lens L8 of the second lens group G2 are aspheric. The fourth-order aspheric coefficient A4, the sixth-order aspheric coefficient A6, the eighth order aspheric coefficient A8, and the tenth order aspheric coefficient A10 of the aspheric surfaces in Numerical Example 4 are shown together with the cone constants k in Table 11.

TABLE 11

| Surface Number | κ | A4 | A6 | A8 | A10 |
|---|---|---|---|---|---|
| 5 | 0.0000 | −1.05E−06 | −6.57E−10 | −1.73E−12 | 4.21E−15 |
| 14 | −1.6554 | 5.10E−06 | −9.77E−10 | 2.06E−11 | −8.11E−15 |

The focal distance f, the F number Fno, the back focus BF, and the half field angle ω of the entire lens system at the infinity focus time in Numerical Example 4 are shown in Table 12.

TABLE 12

| | |
|---|---|
| f | 51.5 |
| Fno | 1.45 |
| BF | 36.098 |
| ω | 23.39 |

Figure 8:
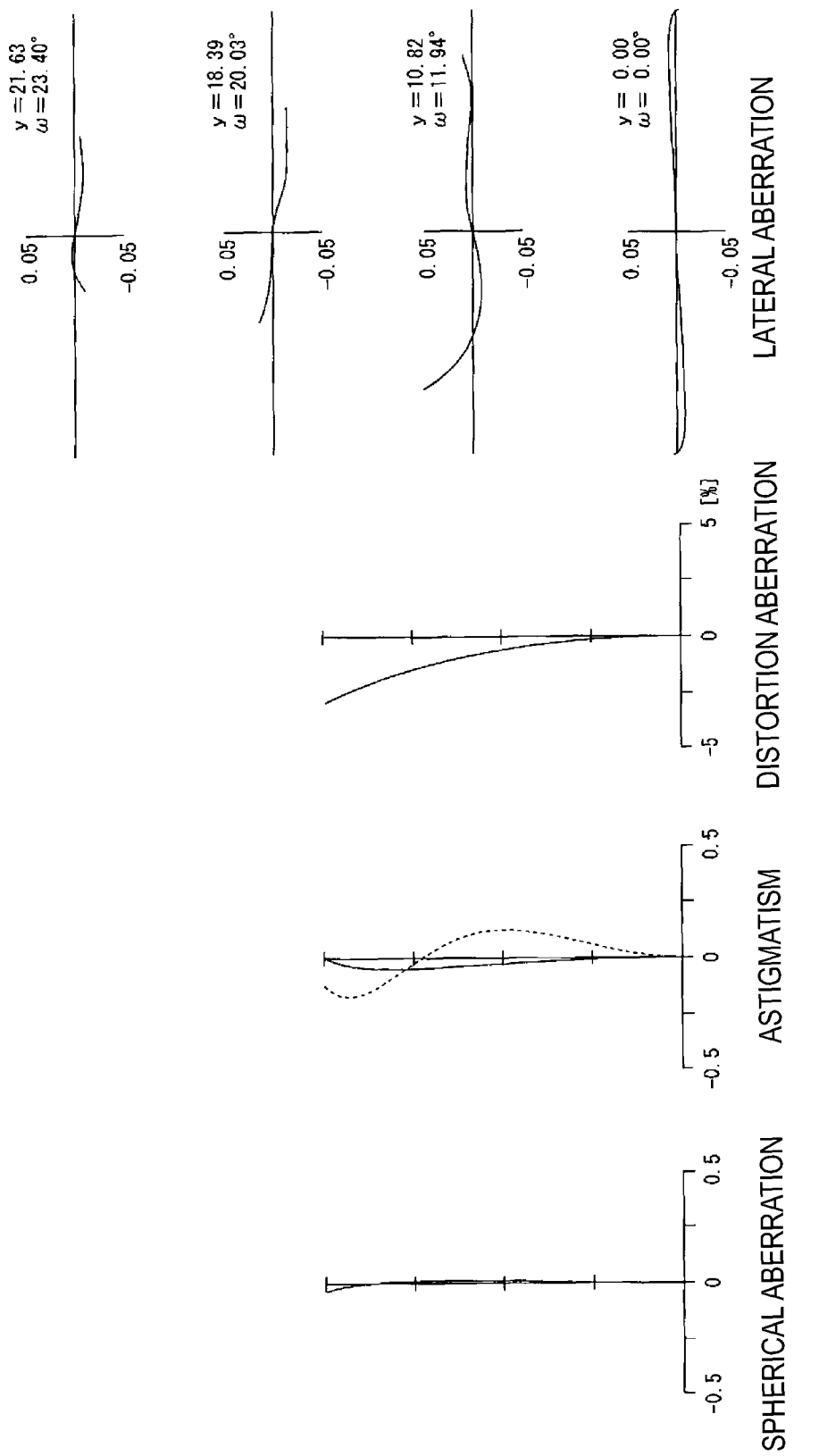
FIG. 8 is a diagram illustrating a spherical aberration, an astigmatism, a distortion aberration, and a lateral aberration in specific numerical values according to the fourth embodiment.

FIG. 8 illustrates a spherical aberration, an astigmatism, a distortion aberration, and a lateral aberration at an infinity focus state in Numerical Example 4.

In FIG. 8, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 4.

Fifth Embodiment

Figure 9:
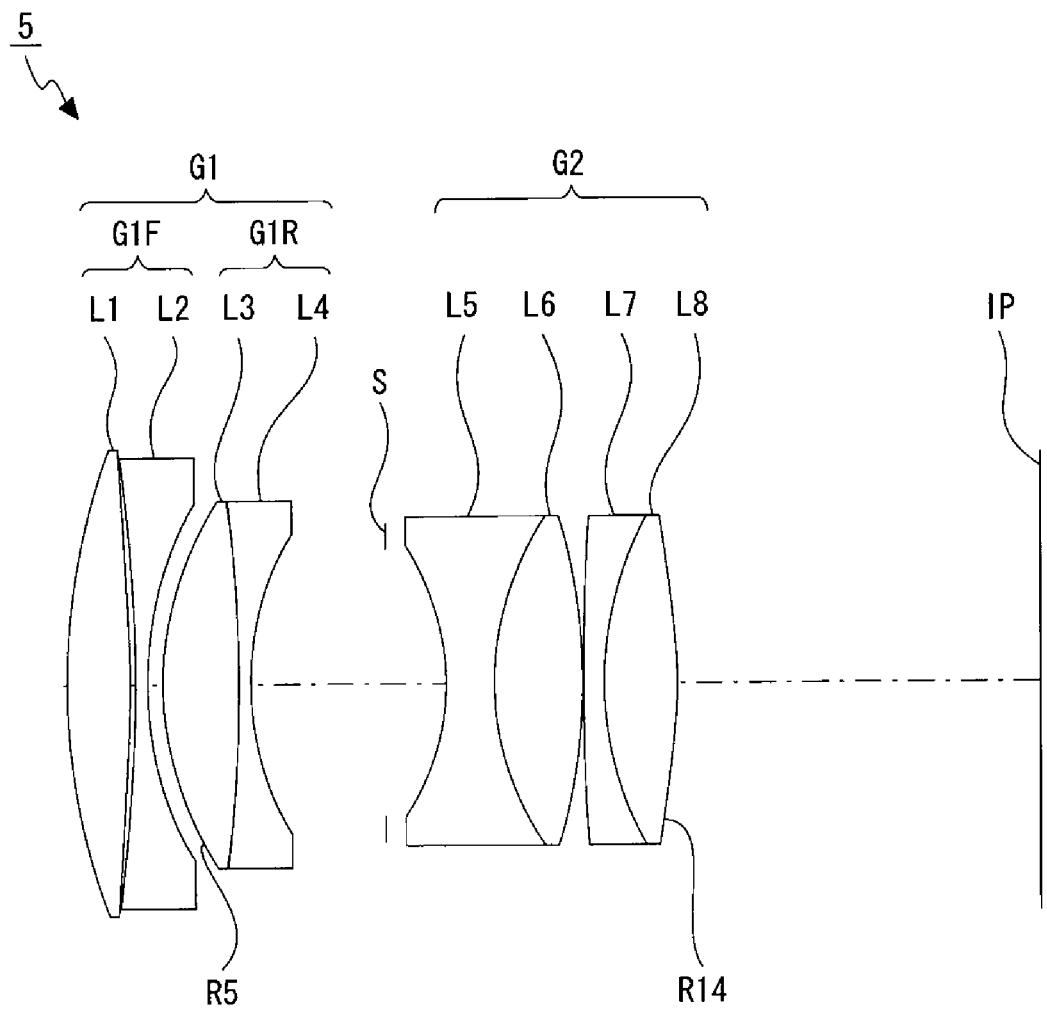
FIG. 9 is a diagram illustrating the configuration of an imaging lens according to a fifth embodiment.

FIG. 9 is a diagram illustrating the configuration of an imaging lens 5 according to a fifth embodiment of the present technology.

In the imaging lens 5, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G2 and is moved from the image side to the object side when the subject distance is changed from infinity to proximity.

Table 1 shows lens data of Numerical Example 5 in which specific numerical values are applied to the imaging lens 5 according to the fifth embodiment.

TABLE 13

| Surface Number | R | D | Nd | vd |
|---|---|---|---|---|
| 1 | 63.363 | 6.096 | 1.834805 | 42.7 |
| 2 | −264.080 | 0.573 | | |
| 3 | −167.023 | 1.300 | 1.592703 | 35.5 |
| 4 | 35.000 | 1.434 | | |
| 5 (ASP) | 31.048 | 7.598 | 1.851348 | 40.1 |
| 6 | −140.556 | 1.200 | 1.615257 | 36.9 |
| 7 | 29.526 | 13.329 | | |
| 8 | infinity | 5.990 | | |
| 9 | −24.660 | 4.732 | 1.639323 | 34.5 |
| 10 | 28.826 | 9.000 | 1.883000 | 40.8 |
| 11 | −56.543 | 0.200 | | |
| 12 | 284.284 | 1.900 | 1.713063 | 29.3 |
| 13 | 32.786 | 7.000 | 1.804200 | 46.5 |
| 14 (ASP) | −64.561 | — | | |

In the imaging lens 5, an object-side surface (fifth surface) of the third lens L3 of the first lens group G1 and an image-side surface (fourteenth surface) of the eighth lens L8 of the second lens group G2 are aspheric. The fourth-order aspheric coefficient A4, the sixth-order aspheric coefficient A 6, the eighth order aspheric coefficient A8, and the tenth order aspheric coefficient A10 of the aspheric surfaces in Numerical Example 5 are shown together with the cone constants k in Table 14.

TABLE 14

| Surface Number | κ | A4 | A6 | A8 | A10 |
|---|---|---|---|---|---|
| 5 | −0.3187 | 4.24E−07 | 1.11E−09 | −3.87E−12 | 1.05E−14 |
| 14 | 1.0513 | 7.15E−06 | −5.97E−09 | 5.00E−11 | −6.39E−14 |

The focal distance f, the F number Fno, the back focus BF, and the half field angle ω of the entire lens system at the infinity focus time in Numerical Example 5 are shown in Table 15.

TABLE 15

| | |
|---|---|
| f | 51.5 |
| Fno | 1.44 |
| BF | 36.000 |
| ω | 23.41 |

Figure 10:
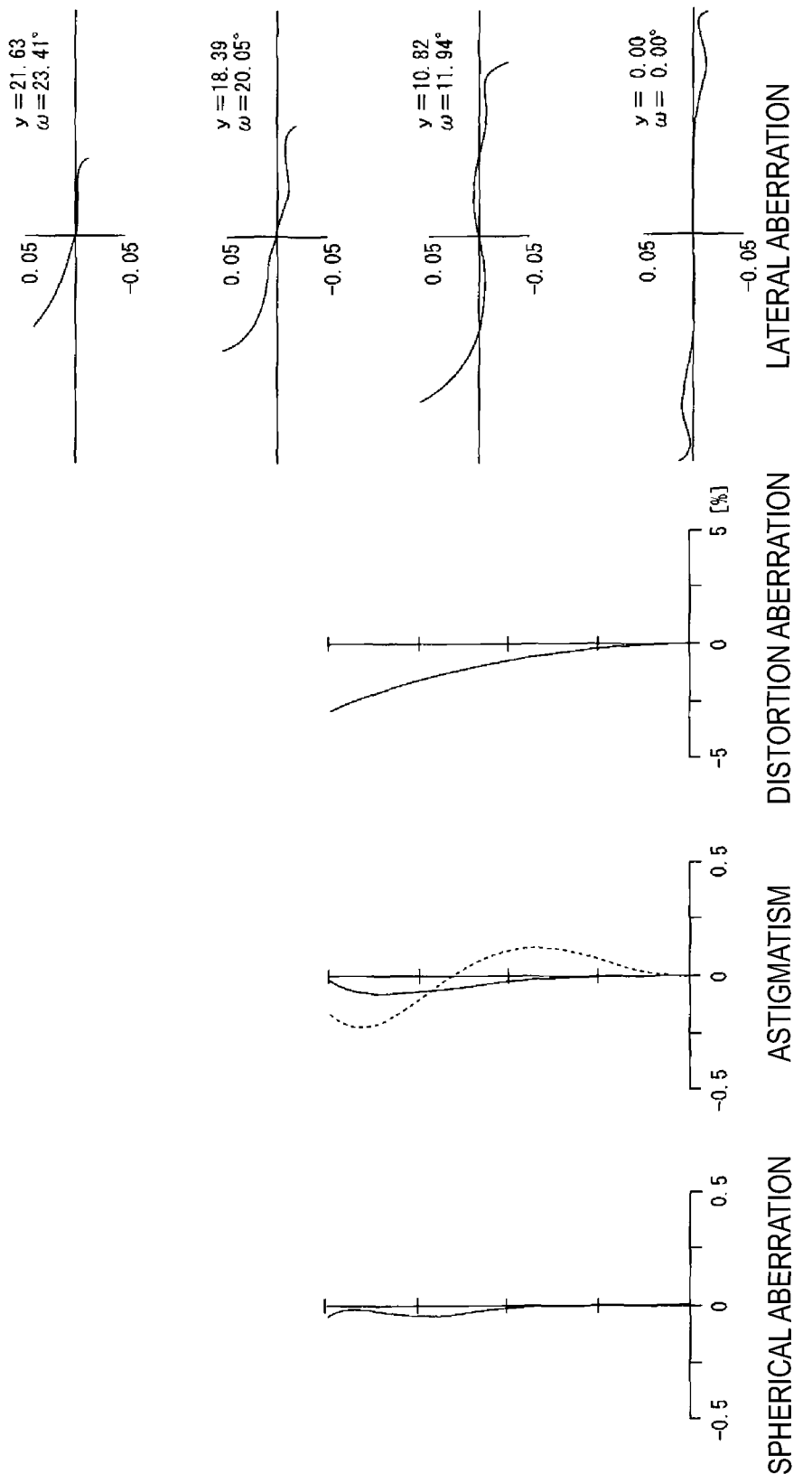
FIG. 10 is a diagram illustrating a spherical aberration, an astigmatism, a distortion aberration, and a lateral aberration in specific numerical values according to the fifth embodiment.

FIG. 10 illustrates a spherical aberration, an astigmatism, a distortion aberration, and a lateral aberration at an infinity focus state in Numerical Example 5.

In FIG. 10, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 5.

Sixth Embodiment

Figure 11:
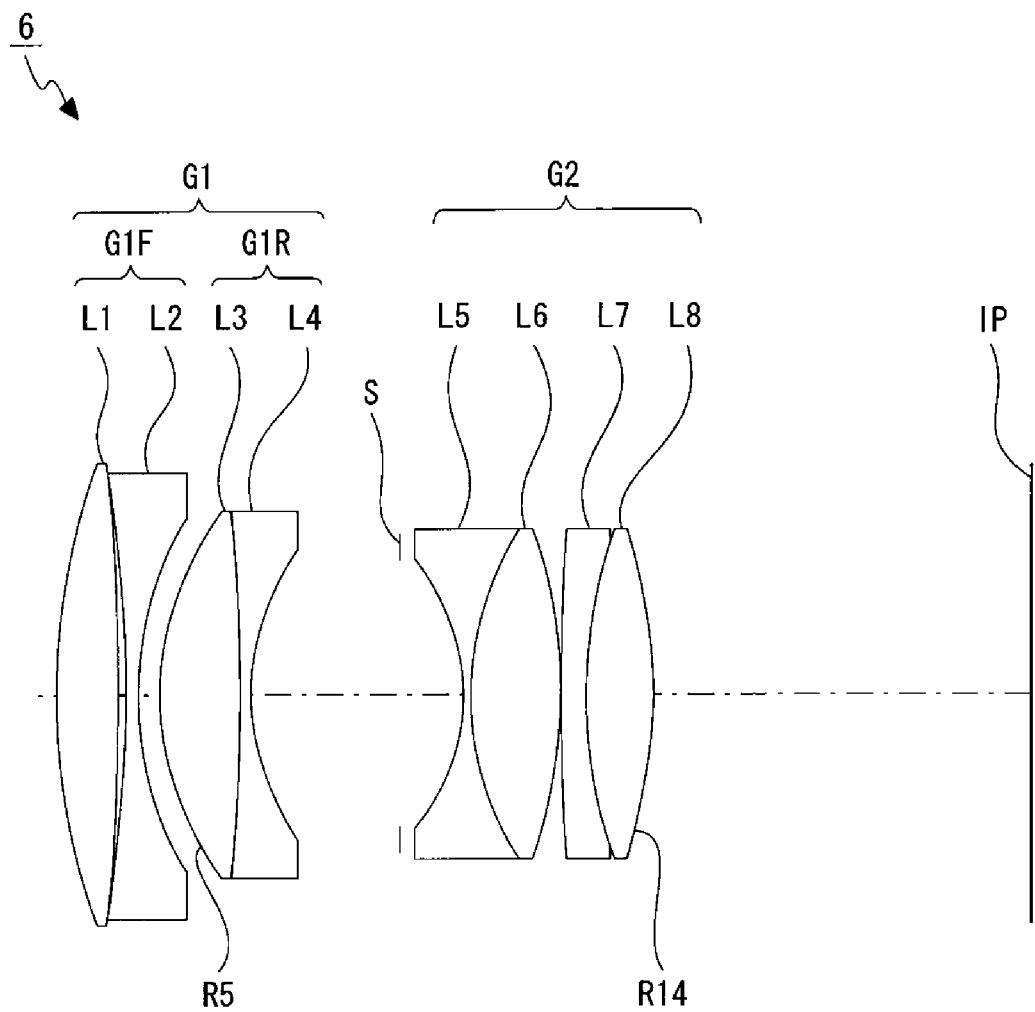
FIG. 11 is a diagram illustrating the configuration of an imaging lens according to a sixth embodiment.

FIG. 11 is a diagram illustrating the configuration of an imaging lens 6 according to a sixth embodiment of the present technology.

In the imaging lens 6, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G 2 and is moved from the image side to the object side when the subject distance is changed from infinity to proximity.

Table 16 shows lens data of Numerical Example 6 in which specific numerical values are applied to the imaging lens 6 according to the sixth embodiment.

TABLE 16

| Surface Number | R | D | Nd | νd |
|---|---|---|---|---|
| 1 | 67.550 | 6.166 | 1.834805 | 42.7 |
| 2 | −185.791 | 0.628 | | |
| 3 | −127.895 | 1.300 | 1.592703 | 35.5 |
| 4 | 35.000 | 2.000 | | |
| 5 (ASP) | 28.466 | 7.888 | 1.851348 | 40.1 |
| 6 | −179.046 | 1.200 | 1.595510 | 39.2 |
| 7 | 24.873 | 14.578 | | |
| 8 | infinity | 6.001 | | |
| 9 | −21.283 | 0.800 | 1.672700 | 32.2 |
| 10 | 29.250 | 8.918 | 1.883000 | 40.8 |
| 11 | −47.574 | 0.200 | | |
| 12 | 218.916 | 2.336 | 1.740770 | 27.8 |
| 13 | 47.742 | 6.494 | 1.801387 | 45.5 |
| 14 (ASP) | −45.475 | — | | |

In the imaging lens 6, an object-side surface (fifth surface) of the third lens L3 of the first lens group G 1 and an image-side surface (fourteenth surface) of the eighth lens L8 of the second lens group G 2 are aspheric. The fourth-order aspheric coefficient A4, the sixth-order aspheric coefficient A 6, the eighth order aspheric coefficient A8, and the tenth order aspheric coefficient A10 of the aspheric surfaces in Numerical Example 6 are shown together with the cone constants k in Table 17.

TABLE 17

| Surface Number | κ | A4 | A6 | A8 | A10 |
|---|---|---|---|---|---|
| 5 | 0.0000 | −1.33E−06 | −8.67E−10 | −1.74E−12 | 1.84E−15 |
| 14 | −1.4361 | 4.42E−06 | 3.48E−10 | 1.29E−11 | 3.29E−15 |

The focal distance f, the F number Fno, the back focus BF, and the half field angle ω of the entire lens system at the infinity focus time in Numerical Example 6 are shown in Table 18.

TABLE 18

| | |
|---|---|
| f | 51.5 |
| Fno | 1.45 |
| BF | 36.986 |
| ω | 23.41 |

Figure 12:
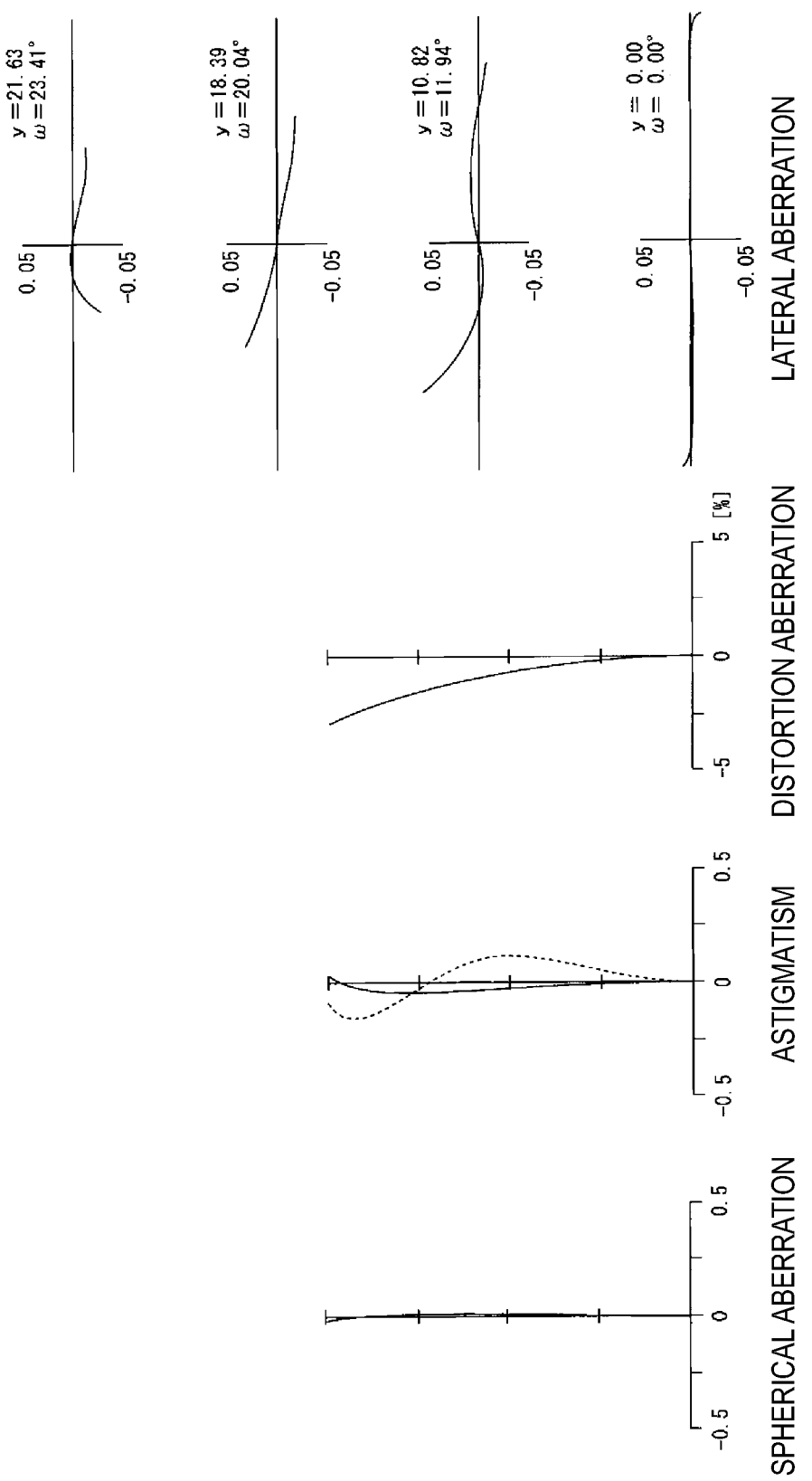
FIG. 12 is a diagram illustrating a spherical aberration, an astigmatism, a distortion aberration, and a lateral aberration in specific numerical values according to the sixth embodiment.

FIG. 12 illustrates a spherical aberration, an astigmatism, a distortion aberration, and a lateral aberration at an infinity focus state in Numerical Example 6.

In FIG. 12, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 6.

Seventh Embodiment

Figure 13:
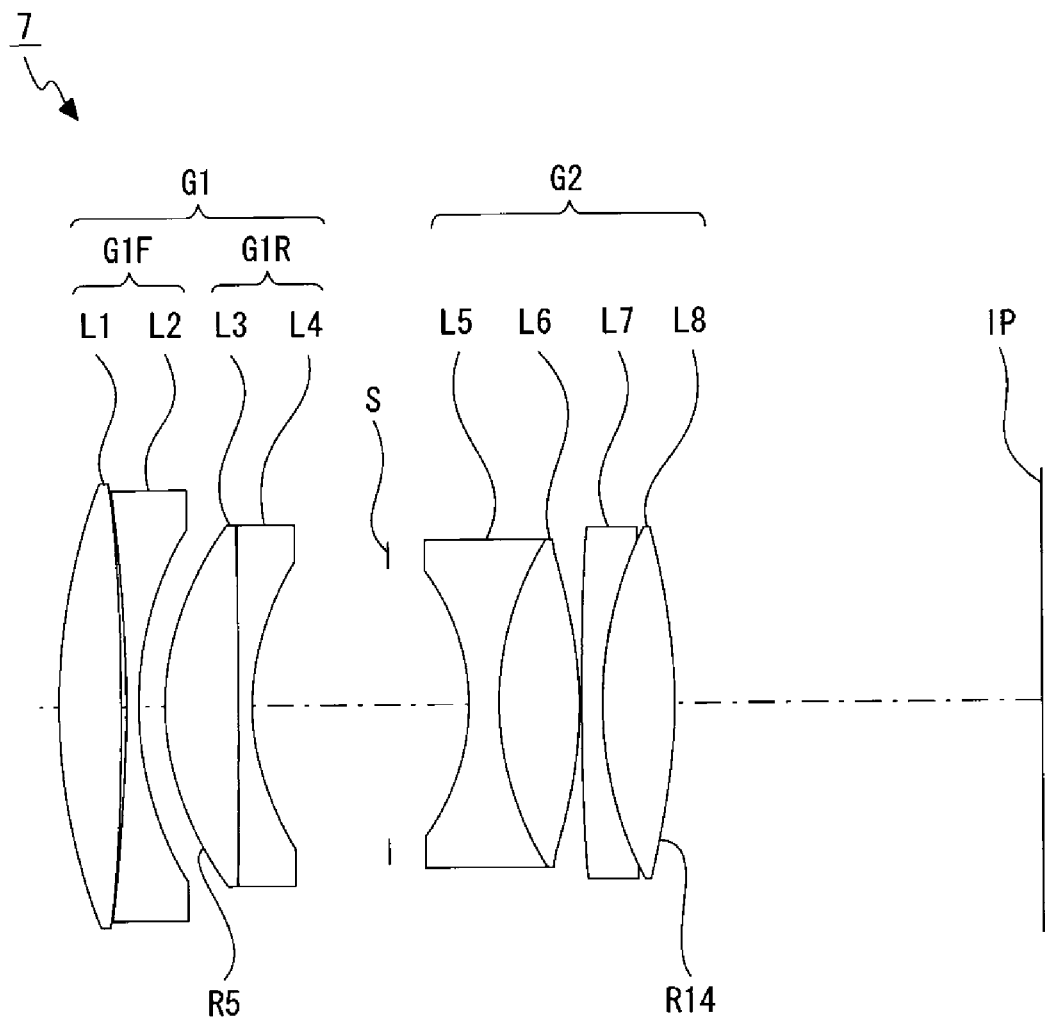
FIG. 13 is a diagram illustrating the configuration of an imaging lens according to a seventh embodiment.

FIG. 13 is a diagram illustrating the configuration of an imaging lens 7 according to a seventh embodiment of the present technology.

In the imaging lens 7, focus is achieved by fixing the first lens group G1 in an optical axis direction and moving the second lens group G2 from an image side to an object side when a subject distance is changed from infinity to proximity.

The first lens group G1 includes an object-side lens group G1F having a negative refractive power and an image-side lens group G1R having a positive refractive power that are configured to be arranged sequentially from the object side to the image side. In an air space of the first lens group G1, an air space between the object-side lens group G1F and the image-side lens group G1R is set to be the maximum.

The object-side lens group G1F includes a first lens L1 having a positive refractive power and a biconvex shape and a second lens L2 having a negative refractive power and a biconcave shape that are configured to be arranged sequentially from the object side to the image side.

The image-side lens group G1R includes a cemented lens in which a third lens L3 located to be closer to the object side, having a positive refractive power, and having a biconvex shape is cemented with a fourth lens L4 located to be closer to the image side, having a negative refractive power, and having a biconcave shape.

The second lens group G2 includes two pairs of cemented lenses, that is, a first cemented lens and a second cemented lens, that are configured to be arranged sequentially from the object side to the image side.

The first cemented lens is configured such that a fifth lens L5 located to be closer to the object side, having a negative refractive power, and having a biconcave shape is cemented with a sixth lens L6 located to be closer to the image side, having a positive refractive power, and having a biconvex shape.

The second cemented lens is configured such that a seventh lens L7 located to be closer to the object side, having a negative refractive power, and having a meniscus shape is cemented with an eighth lens L8 located to be closer to the image side, having a positive refractive power, and having a biconvex shape. The seventh lens L7 is formed in the meniscus shape of which a concave surface is oriented toward the image side.

The aperture stop S is integrally configured with the second lens group G2 and is moved from the image side to the object side when the subject distance is changed from infinity to proximity.

Table 19 shows lens data of Numerical Example 7 in which specific numerical values are applied to the imaging lens 7 according to the seventh embodiment.

TABLE 19

| Surface Number | R | D | Nd | vd |
|---|---|---|---|---|
| 1 | 60.964 | 6.220 | 1.834805 | 42.7 |
| 2 | −202.892 | 0.370 | | |
| 3 | −151.348 | 1.300 | 1.592703 | 35.5 |
| 4 | 35.017 | 2.550 | | |
| 5 (ASP) | 28.711 | 7.180 | 1.851346 | 40.1 |
| 6 | −626.360 | 1.200 | 1.612930 | 37.0 |
| 7 | 25.244 | 13.491 | | |
| 8 | infinity | 7.800 | | |
| 9 | −21.838 | 3.000 | 1.647690 | 33.8 |
| 10 | 30.326 | 7.940 | 1.883000 | 40.8 |
| 11 | −48.059 | 0.200 | | |
| 12 | 236.569 | 2.120 | 1.698950 | 30.1 |

TABLE 19-continued

| Surface Number | R | D | Nd | vd |
|---|---|---|---|---|
| 13 | 38.354 | 6.980 | 1.768015 | 49.2 |
| 14 (ASP) | −50.665 | — | | |

In the imaging lens 7, an object-side surface (fifth surface) of the third lens L3 of the first lens group G1 and an image-side surface (fourteenth surface) of the eighth lens L8 of the second lens group G2 are aspheric. The fourth-order aspheric coefficient A4, the sixth-order aspheric coefficient A6, the eighth order aspheric coefficient A8, and the tenth order aspheric coefficient A10 of the aspheric surfaces in Numerical Example 7 are shown together with the cone constants k in Table 20.

TABLE 20

| Surface Number | κ | A4 | A6 | A8 | A10 |
|---|---|---|---|---|---|
| 5 | 0.0000 | −1.02E−06 | −7.09E−10 | −1.35E−12 | 3.72E−16 |
| 14 | −1.9786 | 4.89E−06 | −8.57E−10 | 2.12E−11 | −7.61E−15 |

The focal distance f, the F number Fno, the back focus BF, and the half field angle ω of the entire lens system at the infinity focus time in Numerical Example 7 are shown in Table 21.

TABLE 21

| f | 51.5 |
|---|---|
| Fno | 1.45 |
| BF | 36.098 |
| ω | 23.41 |

Figure 14:
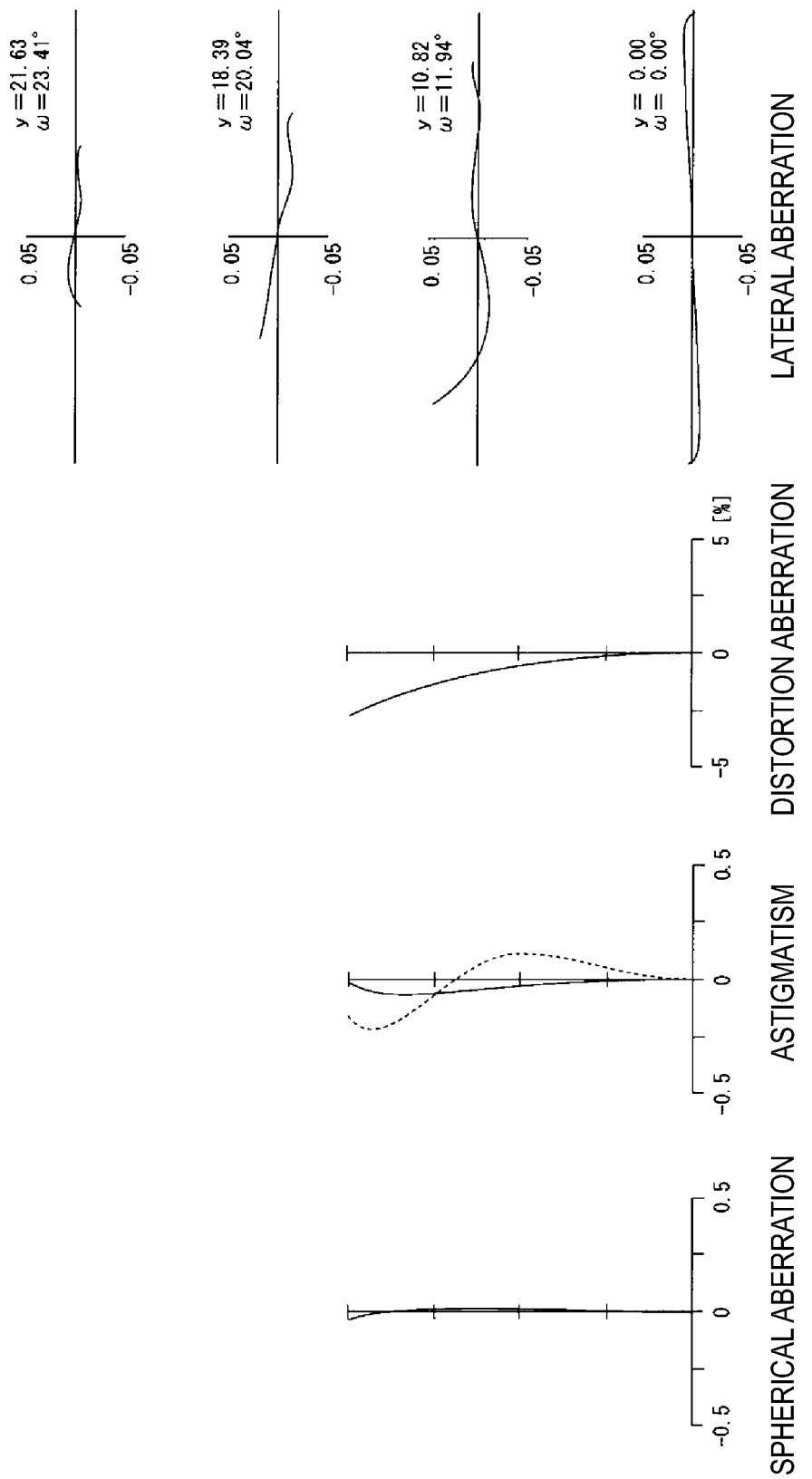
FIG. 14 is a diagram illustrating a spherical aberration, an astigmatism, a distortion aberration, and a lateral aberration in specific numerical values according to the seventh embodiment.

FIG. 14 illustrates a spherical aberration, an astigmatism, a distortion aberration, and a lateral aberration at an infinity focus state in Numerical Example 7.

In FIG. 14, a value of a line d (587.56 nm) in the spherical aberration is illustrated. In the astigmatism, a solid line indicates a value on a sagittal image plane of a line d and a dashed line indicates a value on a meridional image plane of the line d. In the distortion aberration, a value of a line d is illustrated. In the lateral aberration, a value of a line d is illustrated. In the lateral aberration, y denotes an image height and ω denotes a half field angle.

From the aberration diagrams, it is apparent that various aberrations are satisfactorily corrected and excellent imaging performance is realized in Numerical Example 7.

Values of Condition Expressions of Imaging Lens

Hereinafter, values of the condition expressions of the imaging lens according to the embodiments of the present technology will be described.

Table 22 shows each value of the foregoing Condition Expressions (1) and (2) in Numerical Example 1 to Numerical Example 7 of the imaging lenses 1 to 7.

TABLE 22

|  |  | Embodiment 1 | Embodiment 2 | Embodiment 3 | Embodiment 4 | Embodiment 5 | Embodiment 6 | Embodiment 7 |
| --- | --- | --- | --- | --- | --- | --- | --- | --- |
|  | f1F | −339.98 | −356.93 | −335.09 | −522.82 | −331.02 | −276.80 | −518.16 |
|  | f2 | 46.25 | 44.40 | 46.57 | 45.88 | 47.00 | 46.03 | 45.49 |
| Condition Expression(1) | −13.0 < f1F/f2 < −4.0 | −7.35 | −8.04 | −7.35 | −11.39 | −7.04 | −6.01 | −11.39 |
|  | f1 | 158.98 | 165.44 | 157.78 | 154.73 | 144.56 | 161.08 | 157.15 |
|  | f | 51.51 | 51.53 | 51.51 | 51.51 | 51.50 | 51.50 | 51.51 |
| Condition Expression(2) | 1.8 < f1/f < 4.5 | 3.09 | 3.21 | 3.06 | 3.00 | 2.81 | 3.13 | 3.05 |

As apparent from Table 22, the imaging lenses 1 to 7 are configured to satisfy Condition Expression (1) to Condition Expression (2).

Configuration of Imaging Apparatus

An imaging apparatus according to an embodiment of the present technology includes an imaging lens and an image sensor that converts an optical image formed by the imaging lens into an electric signal.

In the imaging apparatus according to the embodiment of the present technology, the imaging lens includes a first lens group having a positive refractive power, an aperture stop, and a second lens group having a positive refractive power that are arranged sequentially from an object side to an image side. Focus is achieved by fixing the first lens group in an optical axis direction and moving the second lens group from the image side to the object side, when a subject distance is changed from infinity to proximity.

The first lens group includes an object-side lens group having a negative refractive power and an image-side lens group having a positive refractive power that are configured to be arranged sequentially from the object side to the image side. In an air space of the first lens group, an air space between the object-side lens group and the image-side lens group is set to be the maximum.

In the imaging apparatus according to the embodiment of the present technology, a rear focus type in which the first lens group is fixed in the optical axis direction and the second lens group is moved from the image side to the object side when the subject distance is changed from infinity to proximity is used as the imaging lens. Accordingly, the focus lens group (second lens group) can be reduced in weight, and thus fast autofocus can be realized.

Further, in the imaging lens of the imaging apparatus according to the embodiment of the present technology, the following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

The foregoing Condition Expression (1) defines a ratio of the focal distance of the object-side lens group to the focal distance of the second lens group at the infinity focus time.

When the ratio is less than the lower limit of the foregoing Condition Expression (1), the refractive power of the object-side lens group is too weak, and thus it may be difficult to ensure sufficient back focus of the lens system. At this time, to ensure the sufficient back focus, it is necessary to strengthen the refractive power of a negative lens disposed to be closer to the image side than the object-side lens group. However, when the refractive power of the negative lens disposed to be closer to the image side than the object-side lens group is strengthened, it may be difficult to correct a spherical aberration or a comatic aberration.

Conversely, when the ratio is greater than the upper limit of the foregoing Condition Expression (1), the refractive power of the second lens group is too weak, an amount of movement of the focus lens group (second lens group) may increase when the subject distance is changed from infinity to proximity, and thus the lens system may increase in size. Further, a change in the spherical aberration may increase at the time of proximity, and thus deterioration in the optical performance may be caused.

Accordingly, when the imaging lens of the imaging apparatus satisfies the foregoing Condition Expression (1), excellent imaging performance from infinity to proximity is ensured while an amount of movement of a focus lens group is set to be small at the time of change in the subject distance from infinity to proximity, and thus optical performance is achieved.

Further, the imaging lens of the imaging apparatus more preferably satisfies the following Condition Expression (1)':

$$-12.0 < f1F/f2 < -5.0. \quad (1)'$$

Accordingly, when the imaging lens of the imaging apparatus satisfies the foregoing Condition Expression (1)', the excellent imaging performance from infinity to proximity is ensured while an amount of movement of a focus lens group is set to be smaller at the time of change in the subject distance from infinity to proximity, and thus optical performance is further achieved.

Embodiment of Imaging Apparatus

Figure 15:
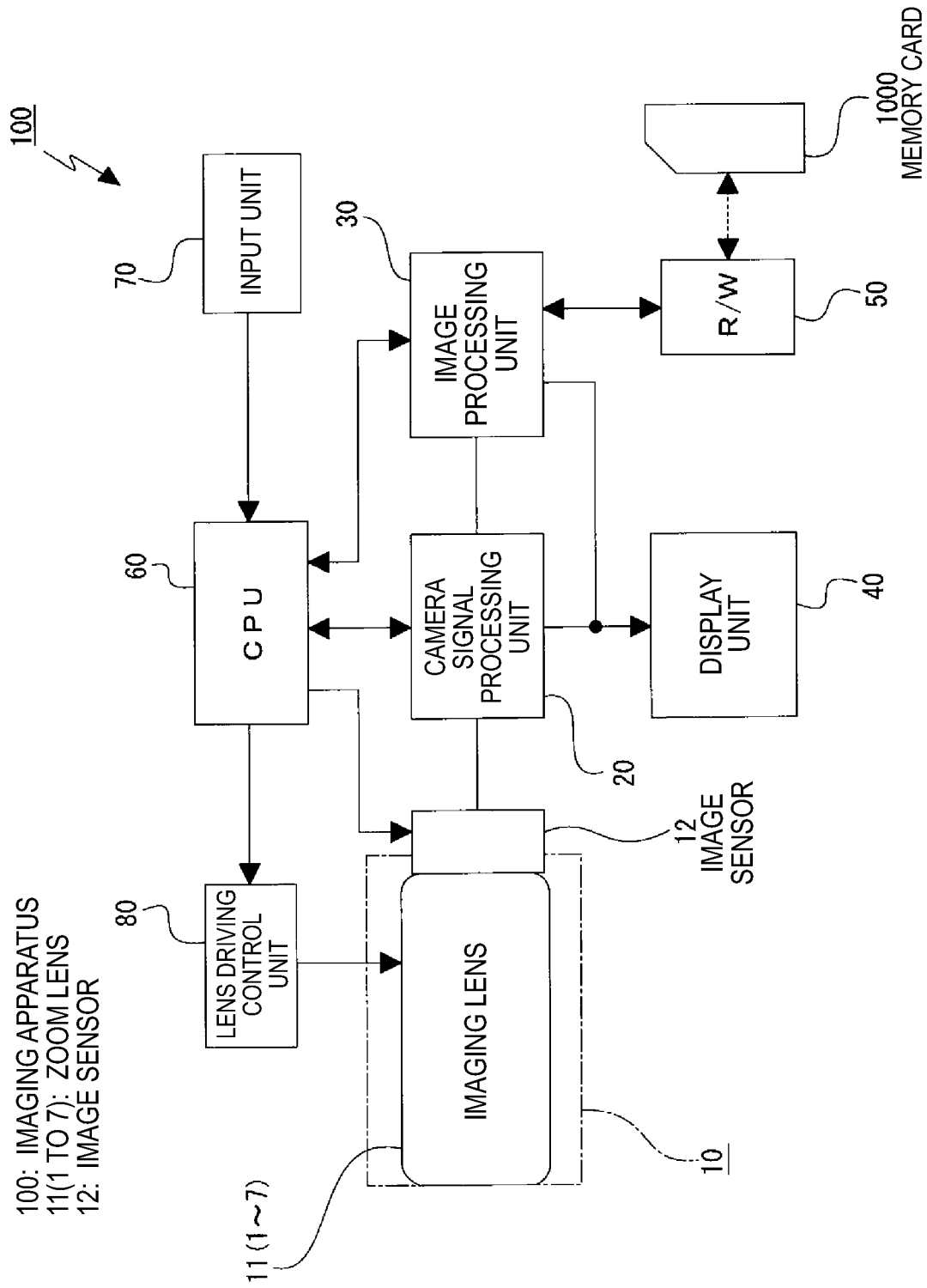
FIG. 15 is a block diagram illustrating an example of an imaging apparatus.

FIG. 15 is a block diagram illustrating an exchange lens type digital camera according to an embodiment of the imaging apparatus of the present technology.

An imaging apparatus (digital camera) 100 includes a camera block 10 having a role of an imaging function, a camera signal processing unit 20 that performs signal processing, such as analog-digital conversion, on a photographed image signal, and an image processing unit 30 that performs recording and reproduction processes on the image signal. The imaging apparatus 100 further includes a display unit 40 such as a liquid crystal display (LCD) that displays a photographed image or the like, a reader/writer (R/W) 50 that writes and reads an image signal on and from a memory card 1000, a central processing unit (CPU) 60 that controls the entire imaging apparatus, an input unit 70 that includes various switches or the like on which a user performs a necessary operation, and a lens driving control unit 80 that controls driving of lenses disposed in the camera block 10.

For example, the camera block 10 can be provided in an exchange lens and includes an optical system including an imaging lens 11 (the imaging lenses 1 to 7 to which the present technology is applied) and an image sensor 12 such as a charge coupled device (CCD) or a complementary metal oxide semiconductor (CMOS).

The camera signal processing unit 20 performs various kinds of signal processing such as conversion of an output signal from the image sensor 12 into a digital signal, noise removal, image quality correction, and conversion into a luminance/color-difference signal.

The image processing unit 30 performs, for example, compression encoding and decompression decoding processes on an image signal based on a predetermined image data format and a process of converting data specifications such as resolution.

The display unit 40 has a function of displaying an operation state of the user on the input unit 70 or various kinds of data such as a photographed image.

The R/W 50 writes image data encoded by the image processing unit 30 on the memory card 1000 and reads the image data recorded on the memory card 1000.

The CPU 60 functions as a control processing unit that controls each circuit block installed in the imaging apparatus 100 and controls each circuit block based on an instruction input signal or the like from the input unit 70.

The input unit 70 includes, for example, a shutter release button used to perform a shutter operation and a selection switch used to select an operation mode. The input unit 70 outputs the instruction input signal to the CPU 60 according to a user's operation.

The lens driving control unit 80 controls a motor or the like (not shown) that drives each lens of the imaging lens 11 based on a control signal from the CPU 60.

The memory card 1000 is, for example, a semiconductor memory that is detachably mounted on a slot connected to the R/W 50.

Hereinafter, an operation of the imaging apparatus 100 will be described.

In a photography standby state, an image signal photographed by the camera block 10 is output to the display unit 40 via the camera signal processing unit 20 and is displayed as a camera through image under the control of the CPU 60. Further, when an instruction input signal is input to perform zooming from the input unit 70, the CPU 60 outputs a control signal to the lens driving control unit 80. Then, a predetermined lens of the imaging lens 11 is moved based on the control of the lens driving control unit 80.

When a shutter (not illustrated) of the camera block 10 is operated by an instruction input signal from the input unit 70, a photographed image signal is output from the camera signal processing unit 20 to the image processing unit 30, is subjected to the compression encoding process, and is converted into digital data with a predetermined data format. The converted data is output to the R/W 50 and is written on the memory card 1000.

Focusing is performed in such a manner that the lens driving control unit 80 moves a predetermined lens of the imaging lens 11 based on a control signal from the CPU 60, for example, when the shutter release button of the input unit 70 is half pressed or the shutter release button is fully pressed to perform recording (photographing).

When image data recorded on the memory card 1000 is reproduced, predetermined image data is read from the memory card 1000 by the R/W 50 in response to an operation on the input unit 70, and is subjected to the decompression decoding process by the image processing unit 30. Thereafter, a reproduced image signal is output to the display unit 40 and a reproduced image is displayed.

Others

In the imaging lens according to the embodiment of the present technology and the image apparatus according to the embodiment of the present technology, another optical element such as a lens having no refractive power or an aperture stop may be disposed in addition to the first and second lens groups. In this case, the imaging lens according to the embodiment of the present technology is practically configured to include two groups, the first and second lens groups.

Present Technology

The present technology can also be configured as below.

<1> An imaging lens including:

a first lens group having a positive refractive power, an aperture stop, and a second lens group having a positive refractive power that are configured to be arranged sequentially from an object side to an image side, wherein focus is achieved by fixing the first lens group in an optical axis direction and moving the second lens group from the image side to the object side when a subject distance is changed from infinity to proximity, wherein the first lens group includes an object-side lens group having a negative refractive power and an image-side lens group having a positive refractive power that are configured to be arranged sequentially from the object side to the image side, wherein, in an air space of the first lens group, an air space between the object-side lens group and the image-side lens group is set to be maximum, and wherein a following Condition Expression (1) is satisfied:

$$-13.0 < f1F/f2 < -4.0, \quad (1)$$

where 1F is a focal distance of the object-side lens group at an infinity focus time and f2 is a focal distance of the second lens group at the infinity focus time.

<2> The imaging lens according to <1>, wherein a following Condition Expression (2) is satisfied, $$1.8 < f1/f < 4.5, \quad (2)$$

where f1 is a focal distance of the first lens group at the infinity focus time and f is a focal distance of an entire lens system at the infinity focus time.

<3> The imaging lens according to <1> or <2>, wherein the object-side lens group includes a first lens having a positive refractive power and a second lens having a negative refractive power that are configured to be arranged sequentially from the object side to the image side.

<4> The imaging lens according to any one of <1> to <3>, wherein the second lens group includes two pairs of cemented lenses.

<5> The imaging lens according to any one of <1> to <4>, wherein each of the first lens group and the second lens group includes at least one aspheric lens.

<6> The imaging lens according to any one of <1> to <5>, wherein, when the subject distance is changed from infinity to proximity, the aperture stop and the second lens group are integrally configured and moved from the image side to the object side.

<7> An imaging apparatus including:

an imaging lens; and an image sensor that converts an optical image formed by the imaging lens into an electric signal, wherein the imaging lens includes a first lens group having a positive refractive power, an aperture stop, and a second lens group having a positive refractive power that are configured to be arranged sequentially from an object side to an image side, wherein focus is achieved by fixing the first lens group in an optical axis direction and moving the second lens group from the image side to the object side when a subject distance is changed from infinity to proximity, wherein the first lens group includes an object-side lens group having a negative refractive power and an image-side lens group having a positive refractive power that are configured to be arranged sequentially from the object side to the image side, wherein, in an air space of the first lens group, an air space between the object-side lens group and the image-side lens group is set to be maximum, and wherein a following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

In the above-described embodiment, the example in which the imaging apparatus is applied to an interchangeable type digital camera has been described. However, an application range of the imaging apparatus is not limited to the interchangeable digital camera. The imaging apparatus may be broadly applied to camera units of digital input and output devices such as a digital still camera, a digital video camera, a camera-embedded cellular phone, a camera-embedded portable terminal, and a personal computer.

The shapes and numerical values of the units according to the above-described embodiments are merely examples to realize an embodiment of the present technology, and the technical scope of the present technology should not be construed as limited thereto.

It should be understood by those skilled in the art that various modifications, combinations, sub-combinations and alterations may occur depending on design requirements and other factors insofar as they are within the scope of the appended claims or the equivalents thereof The present technology contains subject matter related to that disclosed in Japanese Priority Patent Application JP 2012-196889 filed in the Japan Patent Office on Sep. 7, 2012, the entire content of which is hereby incorporated by reference.

What is claimed is:

1. An imaging lens comprising:
    a first lens group having a positive refractive power, an aperture stop, and a second lens group having a positive refractive power that are configured to be arranged sequentially from an object side to an image side,
    wherein focus is achieved by fixing the first lens group in an optical axis direction and moving the second lens group from the image side to the object side when a subject distance is changed from infinity to proximity,
    wherein the first lens group includes an object-side lens group having a negative refractive power and an image-side lens group having a positive refractive power that are configured to be arranged sequentially from the object side to the image side,
    wherein, in an air space of the first lens group, an air space between the object-side lens group and the image-side lens group is set to be maximum, and
    wherein a following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

2. The imaging lens according to claim 1, wherein a following Condition Expression (2) is satisfied, $$1.8 < f1/f < 4.5, \quad (2)$$

where f1 is a focal distance of the first lens group at the infinity focus time and f is a focal distance of an entire lens system at the infinity focus time.

3. The imaging lens according to claim 1, wherein the object-side lens group includes a first lens having a positive refractive power and a second lens having a negative refractive power that are configured to be arranged sequentially from the object side to the image side.

4. The imaging lens according to claim 1, wherein the second lens group includes two pairs of cemented lenses.

5. The imaging lens according to claim 1, wherein each of the first lens group and the second lens group includes at least one aspheric lens.

6. The imaging lens according to claim 1, wherein, when the subject distance is changed from infinity to proximity, the aperture stop and the second lens group are integrally configured and moved from the image side to the object side.

7. An imaging apparatus comprising:
    an imaging lens; and
    an image sensor that converts an optical image formed by the imaging lens into an electric signal,
    wherein the imaging lens includes a first lens group having a positive refractive power, an aperture stop, and a second lens group having a positive refractive power that are configured to be arranged sequentially from an object side to an image side,
    wherein focus is achieved by fixing the first lens group in an optical axis direction and moving the second lens group from the image side to the object side when a subject distance is changed from infinity to proximity,
    wherein the first lens group includes an object-side lens group having a negative refractive power and an image-side lens group having a positive refractive power that are configured to be arranged sequentially from the object side to the image side,
    wherein, in an air space of the first lens group, an air space between the object-side lens group and the image-side lens group is set to be maximum, and
    wherein a following Condition Expression (1) is satisfied:

$$-13.0 < f1F/f2 < -4.0, \quad (1)$$

where f1F is a focal distance of the object-side lens group at an infinity focus time and f2 is a focal distance of the second lens group at the infinity focus time.

* * * * *